(12) United States Patent
Xu et al.

(10) Patent No.: US 12,315,967 B1
(45) Date of Patent: May 27, 2025

(54) HYBRID MEMBRANE BASED ON UIO66 MODIFICATION, PREPARATION METHOD THEREOF, AND USE THEREOF IN FLOW BATTERY

(71) Applicant: NANJING TECH UNIVERSITY, Jiangsu (CN)

(72) Inventors: Zhi Xu, Jiangsu (CN); Kang Huang, Jiangsu (CN)

(73) Assignee: NANJING TECH UNIVERSITY, Jiangsu (CN)

( * ) Notice: Subject to any disclaimer, the term of this patent is extended or adjusted under 35 U.S.C. 154(b) by 0 days.

(21) Appl. No.: 18/961,421

(22) Filed: Nov. 26, 2024

(30) Foreign Application Priority Data

Nov. 27, 2023 (CN) .......................... 202311602980.8

(51) Int. Cl.
*H01M 8/0239* (2016.01)
*H01M 8/18* (2006.01)

(52) U.S. Cl.
CPC ......... *H01M 8/0239* (2013.01); *H01M 8/188* (2013.01)

(58) Field of Classification Search
CPC .............................. H01M 8/0239; H01M 8/188
See application file for complete search history.

(56) References Cited

FOREIGN PATENT DOCUMENTS

CN   116053496   5/2023

OTHER PUBLICATIONS

Li et al. (J Mater Sci (2023) 58:14154-14176, published Sep. 7, 2023, "Efficient proton exchange membranes based on bifunctional metal-organic frameworks").*
Sun et al. (ACS Appl. Mater. Interfaces 2017, 9, 26077-26087, "Rational Design of S-UiO-66@GO Hybrid Nanosheets for Proton Exchange Membranes with Significantly Enhanced Transport Performance".*
Song; Hao, "Preparation and Properties of Proton Exchange Membranes for Vanadium Redox Flow Batteries", Master's thesis, Department of Material Engineering, North China Electric Power University, Jun. 7, 2021, with English abstract, pp. 1-58.
Dezhu Zhang et al., "Advanced Nafion hybrid membranes with fast proton transport channels toward high-performance vanadium redox flow battery", Journal of Membrane Science, Jan. 6, 2021, pp. 1-10, vol. 624.

* cited by examiner

Primary Examiner — Olatunji A Godo
(74) Attorney, Agent, or Firm — JCIPRNET

(57) ABSTRACT

The present disclosure provides a hybrid membrane based on UiO66 modification, a preparation method of the hybrid membrane, and a use of the hybrid membrane in a flow battery. A matrix of the hybrid membrane is doped with carbonized UiO-66, and a surface of the carbonized UiO-66 is further modified with β-CD.

6 Claims, 21 Drawing Sheets

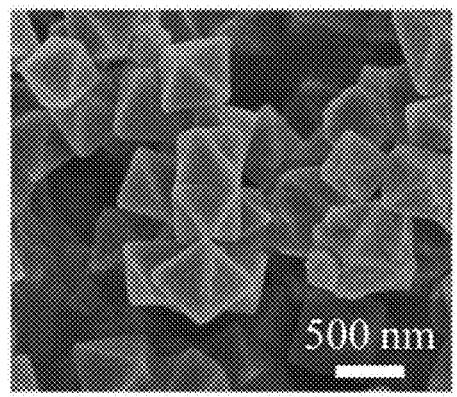
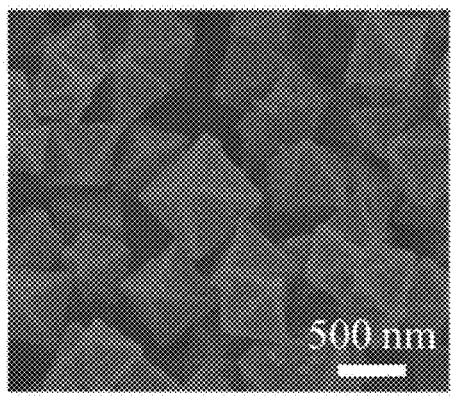
FIG. 1A    FIG. 1B
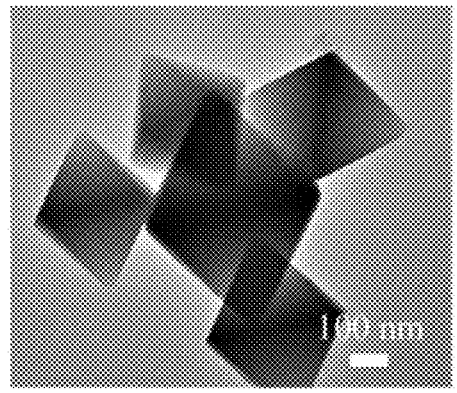
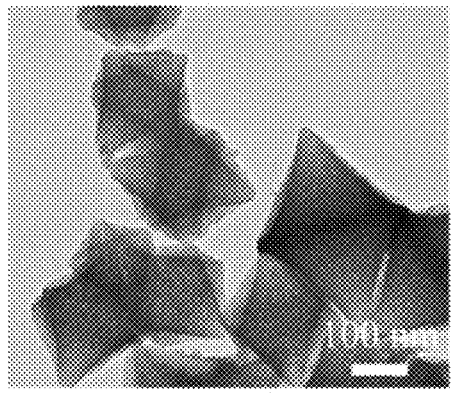
FIG. 1C    FIG. 1D
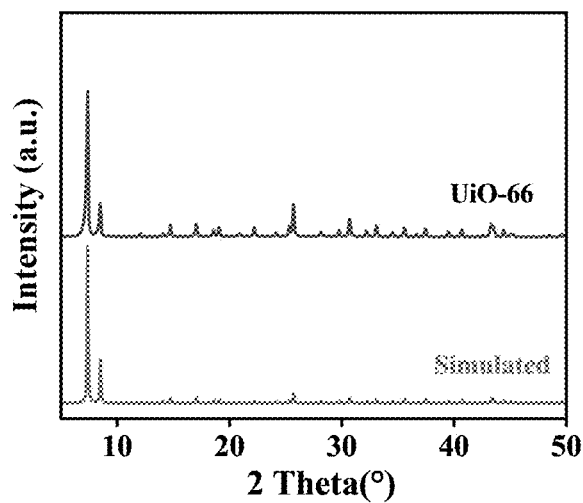
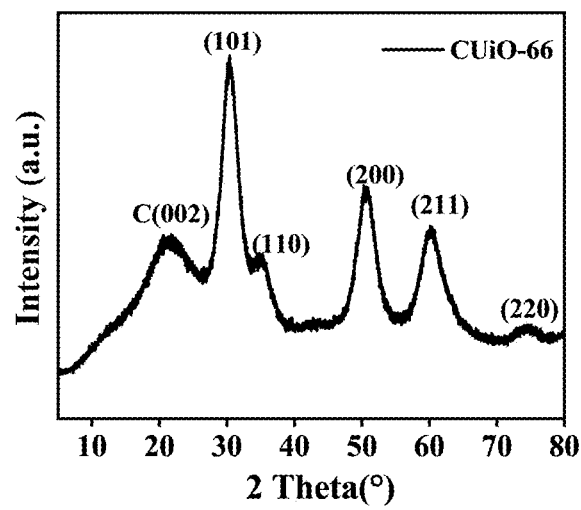
FIG. 2A    FIG. 2B

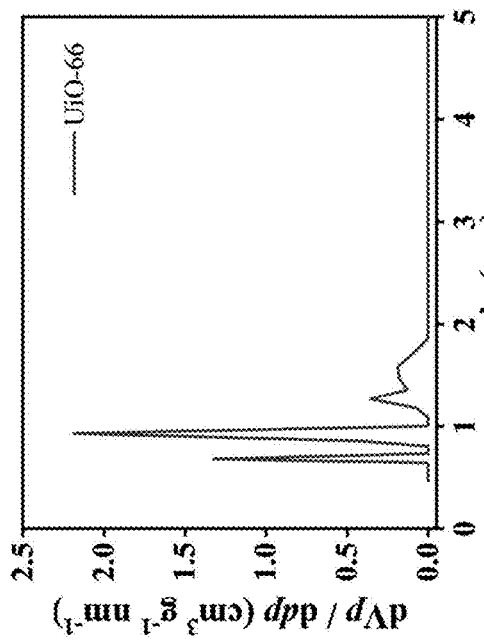
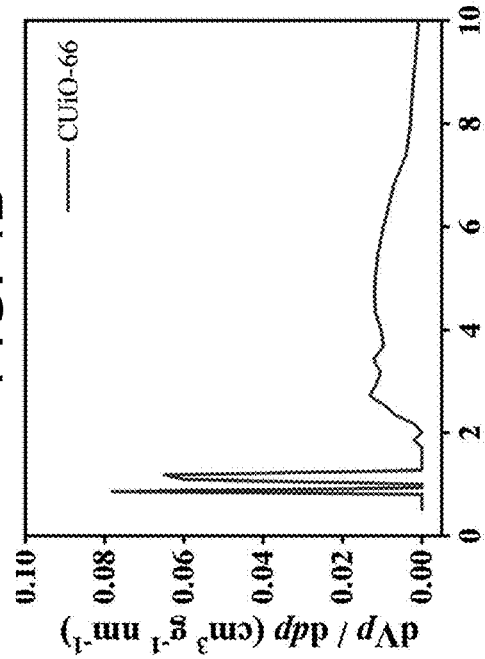
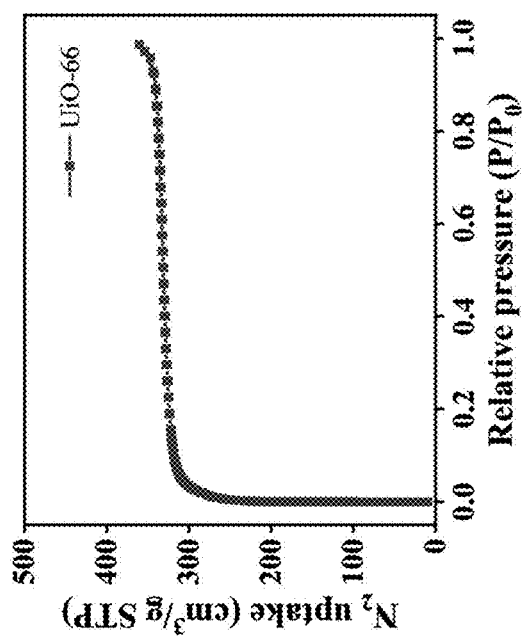
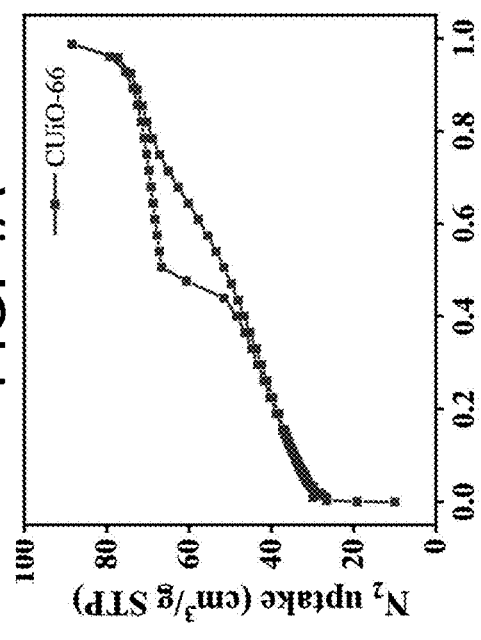

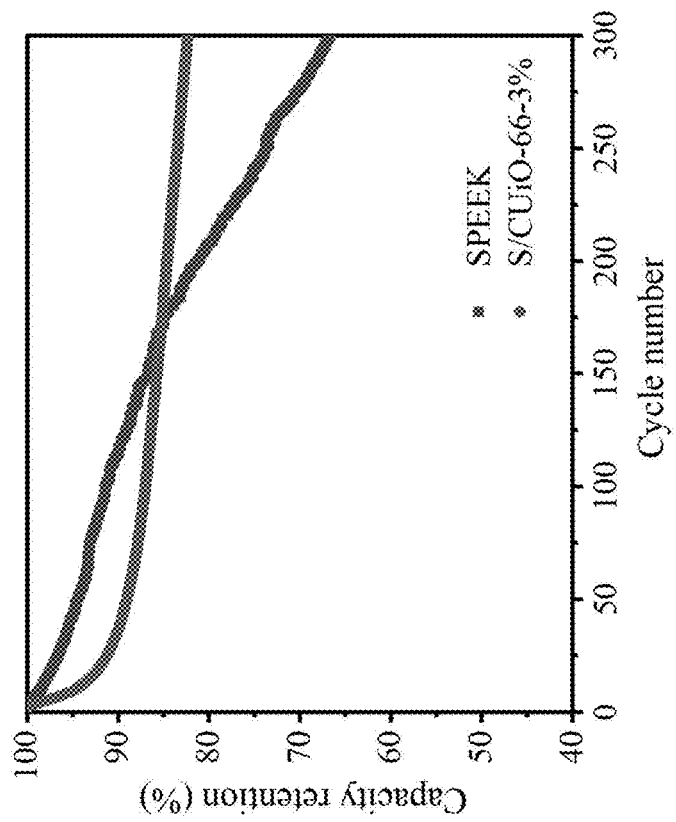
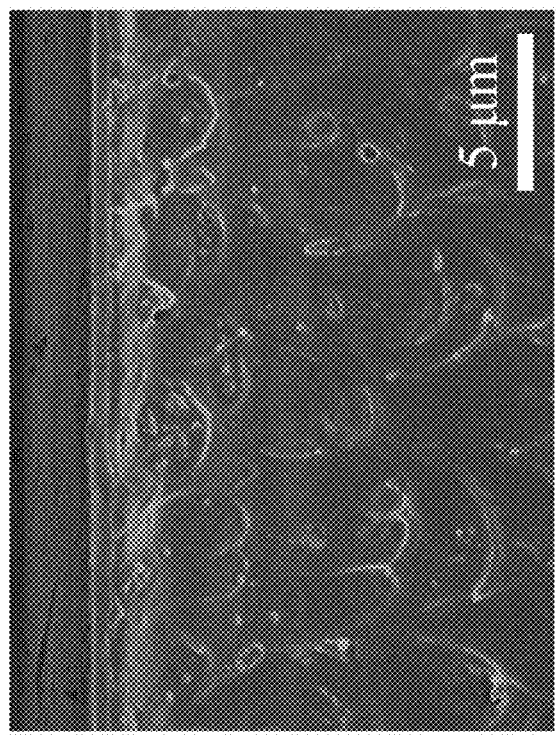
FIG. 15A
FIG. 15B

HYBRID MEMBRANE BASED ON UIO66 MODIFICATION, PREPARATION METHOD THEREOF, AND USE THEREOF IN FLOW BATTERY

CROSS-REFERENCE TO RELATED APPLICATION

This application claims the priority benefit of China application serial no. 202311602980.8, filed on Nov. 27, 2023, now allowed. The entirety of the above-mentioned patent application is hereby incorporated by reference herein and made a part of this specification.

TECHNICAL FIELD

The present disclosure relates to a hybrid membrane based on UiO66 modification, a preparation method of the hybrid membrane, and a use of the hybrid membrane in a flow battery, and belongs to the technical field of hybrid membranes.

BACKGROUND

To overcome the intermittence and uncontrollability of the use of renewable energy, the development of advanced large-scale energy storage technologies is urgent. Vanadium flow batteries (VFBs) have attracted much attention in the field of energy storage due to advantages such as high response rate, flexible design, and long cycling life. A proton exchange membrane (PEM) is one of the main components of VFB. PEM can block active ions while conducting protons to form an internal circuit. PEM directly determines the performance of a battery. Ideal PEMs should have low reactive ion permeability, high proton conductivity, and excellent chemical stability. Currently, the most common PEMs are Nafion perfluorosulfonic acid membranes. However, the further development of the Nafion™ perfluorosulfonic acid membranes is greatly limited due to disadvantages such as poor ion selectivity and high cost. Therefore, it is necessary to develop new low-cost alternative membrane materials.

Proton-conducting sulfonated poly(ether ether ketone) (SPEEK) membranes with small water channels are the most promising PEMs. Although SPEEK can reduce a cost of a membrane, the membrane has poor cycling stability in VFB because SPEEK is easily degraded in strongly oxidative and acidic media. Metal-organic frameworks (MOFs) with regular and adjustable pores and large specific surface areas have been used to modify SPEEK membranes, but the stability of MOFs in acidic environments limits the practical application.

SUMMARY

In order to overcome the deficiencies of the prior art, the present disclosure provides a hybrid membrane based on UiO66 modification, a preparation method of the hybrid membrane, and a use of the hybrid membrane in a flow battery. The hybrid membrane has prominent chemical stability under strong acid and strong oxidation conditions.

The present disclosure adopts the following technical solutions.

A hybrid membrane based on UiO66 modification is provided. The hybrid membrane mainly includes a polymer matrix doped with carbonized UiO-66.

The polymer matrix is SPEEK.

Preferably, a surface of the carbonized UiO-66 is further modified with β-cyclodextrin (β-CD).

A preparation method of the hybrid membrane based on the UiO66 modification includes the following steps:

S1, preparing and carbonizing UiO-66 to obtain the carbonized UiO-66; and

S2, mixing the carbonized UiO-66 with the SPEEK to prepare a casting solution, and preparing the hybrid membrane with the casting solution through casting.

Preferably, after the S1 and before the S2, the preparation method further includes a step of modifying the surface of the carbonized UiO-66 with the β-CD.

Preferably, in the S1, the UiO-66 is prepared through hydrothermal synthesis, including the following steps: dissolving $ZrCl_4$, terephthalic acid, and acetic acid in N,N-dimethylformamide (DMF), thoroughly mixing, and performing a hydrothermal treatment; and cooling, centrifuging, washing, and drying to obtain the UiO-66, where the $ZrCl_4$, the terephthalic acid, and the acetic acid are in a ratio of (180 to 200) mg:(120 to 140) mg:(8 to 12) g.

Preferably, in the S1, the carbonizing of the UiO-66 is conducted as follows: placing the UiO-66 in a tube furnace; in an argon atmosphere, performing gradient heating and heat preservation until a temperature reaches 550° C. to 650° C.; and annealing for 4 h to 6 h, followed by cooling.

Preferably, the step of modifying the surface of the carbonized UiO-66 with the β-CD is conducted as follows: dissolving the carbonized UiO-66 in DMF, adding the β-CD, stirring and filtering to obtain a filter residue, and oven-drying the filter residue, where a mass ratio of the β-CD to the carbonized UiO-66 is 1:(0.8 to 1.2).

Preferably, in the S2, a preparation process of the casting solution includes: dispersing the carbonized UiO-66 and the SPEEK in DMF, and performing an ultrasonic treatment and ball-milling, where an amount of the carbonized UiO-66 is 1% to 4% of an amount of the SPEEK.

Preferably, in the S2, the preparing of the hybrid membrane with the casting solution through the casting is conducted as follows: scrape-coating the casting solution on a scraper machine, preforming at 55° C. to 75° C. for 5 h to 7 h, drying at 90° C. to 110° C. under vacuum for 11 h to 14 h, cooling, and peeling the hybrid membrane off.

A use of the hybrid membrane based on the UiO66 modification described above in a VFB is provided.

The present disclosure has the following advantages.

(1) The hybrid membrane has a dense and uniform cross section, and exhibits prominent chemical stability under strong acid and strong oxidation conditions.

(2) Due to an interaction between β-CUiO-66 and SPEEK, a water uptake rate and a tensile strength of the SPEEK/β-CUiO-66 hybrid membrane are greatly improved and a swelling rate of the SPEEK/β-CUiO-66 hybrid membrane decreases significantly compared with the SPEEK membrane. In addition, SPEEK/β-CUiO-66 hybrid membranes with different β-CUiO-66 contents all have better performance than an SPEEK/CUiO-66 hybrid membrane with a corresponding doping ratio.

(3) The VFB assembled with an S/β-CUiO-66-3% hybrid membrane has a higher voltage efficiency (VE) and energy efficiency (EE) than an SPEEK membrane and an S/CUiO-66-3% hybrid membrane.

BRIEF DESCRIPTION OF THE DRAWINGS

FIG. 1A to FIG. 1D show scanning electron microscopy (SEM) and transmission electron microscopy (TEM) images of UiO-66 and CUiO-66, where FIG. 1A is an SEM image of UiO-66, FIG. 1B is an SEM image of CUiO-66, FIG. 1C is a TEM image of UiO-66, and FIG. 1D is a TEM image of CUiO-66;

FIG. 2A and FIG. 2B show an X-ray diffraction (XRD) pattern of UiO-66 in FIG. 2A and an XRD pattern of CUiO-66 in FIG. 2B;

FIG. 4A to FIG. 4D show Brunauer-Emmett-Teller (BET) test results of UiO-66 and CUiO-66, where FIG. 4A shows a $N_2$ adsorption-desorption isotherm of UiO-66, FIG. 4B shows a pore size distribution of UiO-66, FIG. 4C shows a $N_2$ adsorption-desorption isotherm of CUiO-66, and FIG. 4D shows a pore size distribution of CUiO-66;

FIG. 15A and FIG. 15B show capacity retention rates of an SPEEK membrane and an S/CUiO-66-3% membrane at a current density of 100 mA $cm^{-2}$ in FIG. 15A, and a cross-section SEM image of the S/CUiO-66-3% membrane after 500 charge-discharge cycles in FIG. 15B;

DETAILED DESCRIPTION OF THE EMBODIMENTS

Figure 3A:
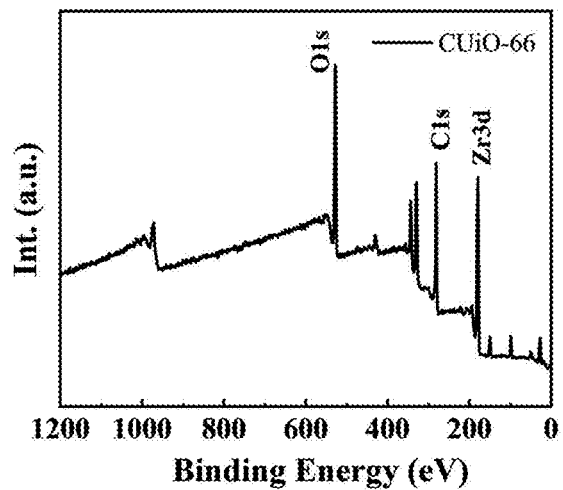
FIG. 3A to FIG. 3D show an X-ray photoelectron spectroscopy (XPS) full-spectrum of CUiO-66 in FIG. 3A and high-resolution XPS spectra of Zr3d, C1s, and O1s in FIG. 3B to FIG. 3D, respectively.

The present disclosure is specifically described below in conjunction with the accompanying drawings and examples.

Example 1

Preparation of UiO-66

UiO-66 was prepared through hydrothermal synthesis. The hydrothermal synthesis includes the following steps. 81.7 mL of DMF was added to a 250 mL beaker, and 190.3 mg of $ZrCl_4$, 133 mg of terephthalic acid, and 9.6 g of acetic acid were weighed and added to the DMF to obtain a mixture. The mixture was continuously stirred for 4 h at room temperature, ultrasonically treated for 20 min, then transferred to a 100 mL reactor, and subjected to a hydrothermal treatment at 120° C. for 24 h to obtain a reaction solution. The reaction solution was naturally cooled to room temperature and then centrifuged (10,000 r/min, 5 min) to collect a UiO-66 nanocrystal. The UiO-66 nanocrystal was washed with excess DMF and methanol several times, to collect a white product. Finally, the white product was dried overnight in a 60° C. oven to obtain a sample denoted as UiO-66.

Preparation of Carbonized UiO-66 (CUiO-66)

A specified mass of a UiO-66 powder was weighed and added to a crucible, then placed in a palm tube furnace, and directly carbonized under an argon atmosphere. A carbonization process was as follows: The UiO-66 powder was heated at a heating rate of 5° C. $min^{-1}$ from 20° C. to 200° C. and kept at 200° C. for 1 h, then heated at the same heating rate to 400° C. and kept at 400° C. for 1 h, heated at a heating rate of 3° C. $min^{-1}$ to a target temperature of 600° C., annealed at the target temperature for 5 h, and finally naturally cooled to obtain a black powder denoted as CUiO-66.

Preparation of SPEEK/CUiO-66 Hybrid Membranes

An SPEEK/CUiO-66 hybrid membrane was prepared from a solution through casting. A specified amount of CUiO-66 was dispersed in 10 mL of DMF to obtain a CUiO-66/DMF mixed solution, then 1.5 g of SPEEK was added to the CUiO-66/DMF mixed solution, an ultrasonic treatment was conducted for 30 min, and ball-milling was conducted for 24 h to obtain a homogeneous casting solution. The casting solution was allowed to stand for a few minutes before being scrape-coated. The casting solution was scrape-coated on a scraper machine, and then a corresponding glass plate was placed in a 60° C. blast drying oven for 6 h to allow preforming, then dried in a 100° C. vacuum-drying oven for 12 h, naturally cooled, and soaked in deionized water to peel off a hybrid membrane. The prepared hybrid membranes each were soaked in a 1 M $H_2SO_4$ solution for 24 h to allow activation, and then stored in fresh deionized water for later use. Corresponding hybrid membranes are denoted as S/CUiO-66-x %, where S represents SPEEK and x % represents a mass ratio of CUiO-66 to SPEEK (1 wt % to 4 wt %).

Characterization of Materials

Morphology Analysis

Morphologies of UiO-66 and CUiO-66 were compared through SEM and TEM characterization, as shown in FIG. 1A to FIG. 1D. The prepared UiO-66 had a regular octahedral structure, a smooth surface, and a uniform particle size of about 500 nm. After the high-temperature carbonization, a morphology of the sample remained unchanged, a highly-symmetrical geometry was retained, and an average particle size was reduced to about 400 nm (FIG. 1B).

XRD Characterization

Phase structures of the prepared samples (UiO-66 and CUiO-66) were analyzed by XRD, and analysis results were shown in FIG. 2A and FIG. 2B. UiO-66 had obvious characteristic diffraction peaks consistent with simulated data, indicating that the UiO-66 crystal was successfully synthesized and had excellent crystallinity. After the carbonization, the characteristic peaks disappeared completely. An XRD pattern of CUiO-66 was consistent with an XRD pattern of $ZrO_2$, indicating that a main component of CUiO-66 was $ZrO_2$. In addition, in the XRD pattern of CUiO-66, a diffraction peak of carbon (002) appeared at $2\theta=24°$, indicating that a stable carbon structure was formed during the carbonization.

XPS Characterization

Figure 3B:
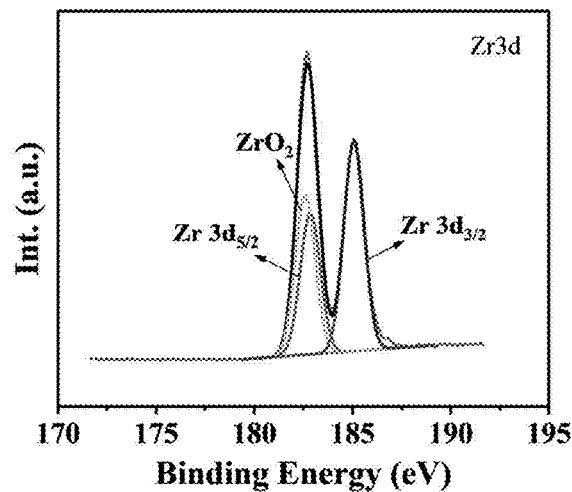
Figure 3C:
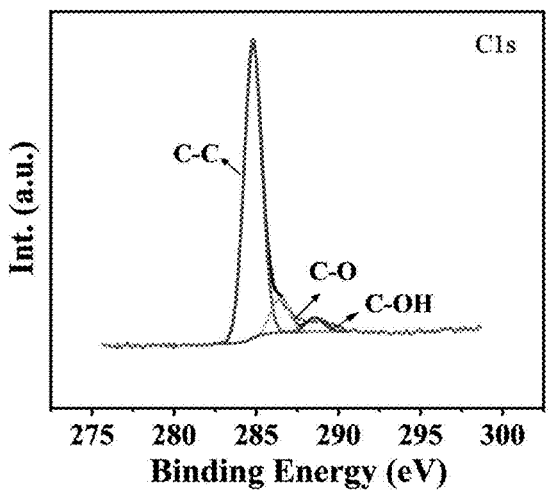
Figure 3D:
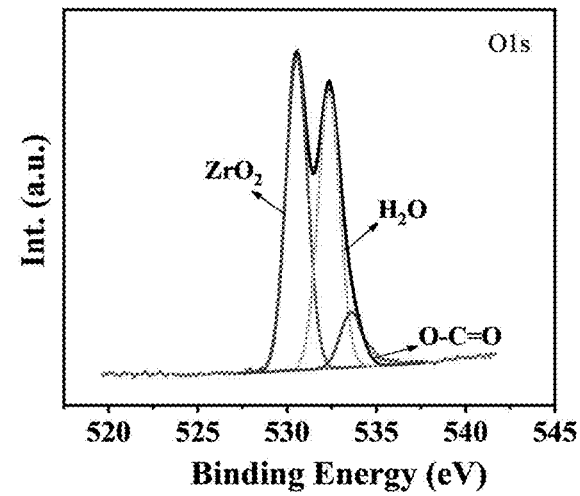

FIG. 3A to FIG. 3D shows XPS spectra of CUiO-66. It can be seen from the full-spectrum that CUiO-66 was composed of C, O, and Zr elements. In the spectrum of C1s, C—C, C—O, and C—OH peaks appeared. The high-resolution spectrum of Zr3d in FIG. 3B shows characteristic peaks of $Zr3d_{5/2}$, $Zr3d_{3/2}$, and $ZrO_2$. FIG. 3D shows a high-resolution XPS spectrum of O1s, where three valence bond structures of $ZrO_2$, $H_2O$, and O—C=O for O correspond to the characteristic peaks at 530.0 eV, 532.2 eV, and 533.3 eV, respectively. The spectra of Zr3d and O1s that each include a $ZrO_2$ peak indicate that $ZrO_2$ was formed after the carbonization, which is consistent with the XRD analysis result.

BET Characterization

BET specific surface areas and pore size distributions of UiO-66 and CUiO-66 are shown in FIG. 4A to FIG. 4D. A $N_2$ adsorption-desorption isotherm of UiO-66 is a type I isotherm. UiO-66 has a pore size of 2 nm or less, indicating an obvious micropore characteristic. In addition, UiO-66 has a high specific surface area (1,295.1 $m^2$ $g^{-1}$). A $N_2$ adsorption-desorption isotherm of the carbonized material CUiO-66 is a type IV isotherm, and has a type H3 hysteresis loop in a relative pressure range of 0.4 to 0.9. A specific surface area of the carbonized material CUiO-66 is reduced to 132.4 $m^2$ $g^{-1}$. It can be seen from the pore size distribution of CUiO-66 that, after the carbonization, a pore size of the material increases and a pore size distribution of the material is widened, indicating that the original microporous structure has been transformed into a mesoporous structure through the carbonization. The mesoporous structure is conducive to the entry and exit of protons, which may be favorable for improving a proton mobility.

Stability Analysis

Figure 5B:
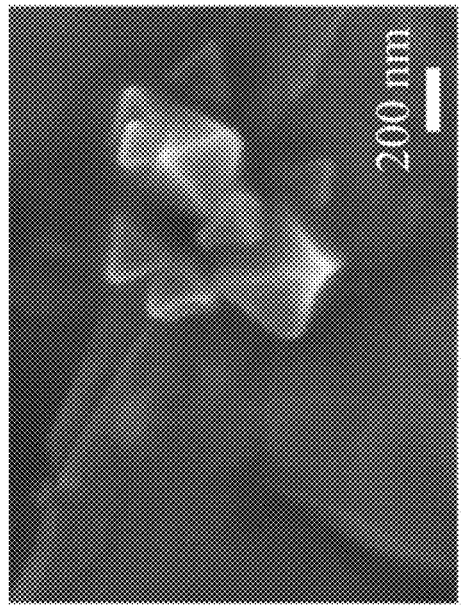
FIG. 5A and FIG. 5B show SEM images of CUiO-66 after being soaked in 3 M $H_2SO_4$ FIG. 5A and in a vanadium-containing acidic electrolyte solution (1.5 M $VO_2$+3 M $H_2SO_4$) FIG. 5B for 2 d.
Figure 5A:
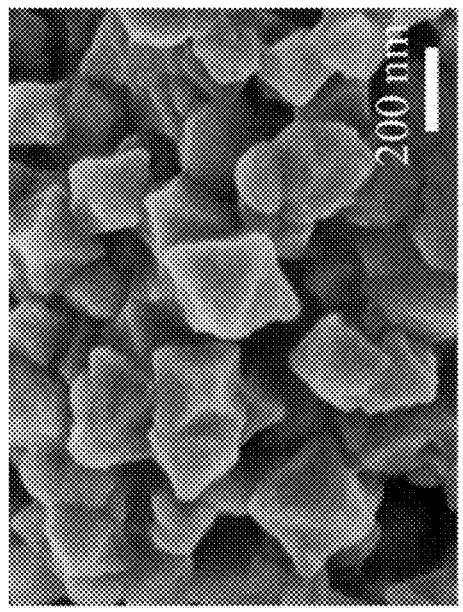

CUiO-66 was added to a 3 M sulfuric acid solution and a vanadium-containing acidic electrolyte solution (1.5 M $VO_2^++3$ M $H_2SO_4$), and stored at room temperature for several days to verify the acid stability of CUiO-66. Microscopic morphology changes of CUiO-66 were observed by SEM. It can be seen from FIG. 5A and FIG. 5B that, due to the structural stability of CUiO-66, there was no significant change in a shape and a size of CUiO-66 compared with UiO-66 after the soaking. Although there was an electrolyte residue on a surface of particles soaked in the electrolyte, a clear octahedral structure could still be observed, indicating that CUiO-66 has excellent chemical stability in an acidic environment and can be used in a VFB system.

Basic Characterization of SPEEK/CUiO-66 Hybrid Membranes

Morphology Analysis

Figure 6A:
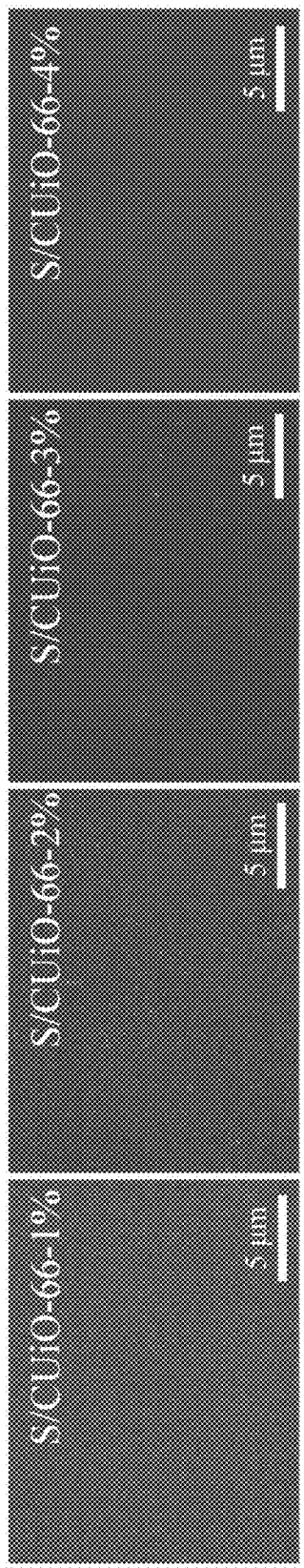
FIG. 6A and FIG. 6B show surface FIG. 6A and cross-section FIG. 6B SEM images of S/CUiO-66-x % membranes (x=1 wt %, 2 wt %, 3 wt %, and 4 wt %)
Figure 6B:
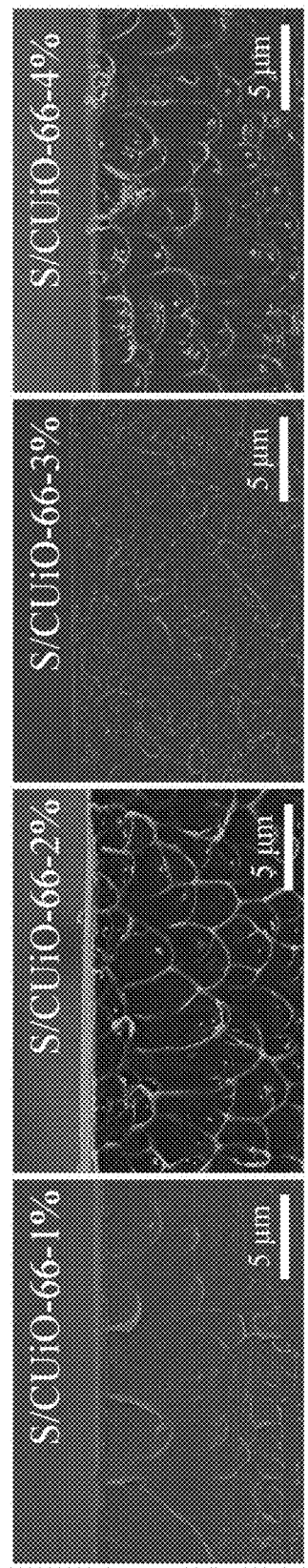
Figure 7:
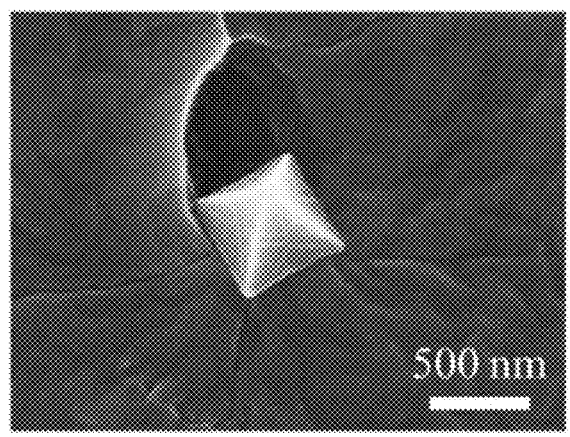
FIG. 7 shows an SEM image of a CMOF/polymer interface in an S/CUiO-66-3% membrane.

Surface and cross-section morphologies of each membrane were characterized by SEM to investigate a quality and an internal microstructure of each membrane. FIG. 6A and FIG. 6B show surface and cross-section SEM images of the hybrid membranes, respectively. It can be seen from the surface SEM images that the hybrid membranes are dense and have significant bulges compared with a surface of the SPEEK membrane. According to the cross-section SEM images: When a doping amount of CUiO-66 is 1 wt % to 3 wt %, the particles are uniformly distributed in the SPEEK matrix, and a prominent filler/polymer interface can be observed after further magnification (FIG. 7), indicating that CUiO-66 has excellent compatibility with SPEEK, which is conducive to improving the mechanical strength and stability of a membrane. When a doping amount of CUiO-66 is greater than 3 wt %, the uniformity of particles dispersed in a membrane is poor, and slight particle agglomeration occurs.

Chemical Stability Analysis

Figure 8A:
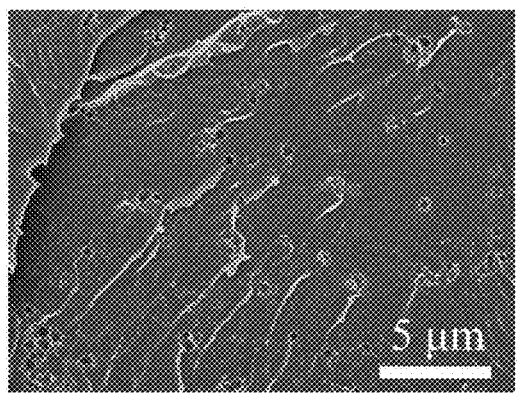
FIG. 8A to FIG. 8D show a cross-section SEM image of an S/UiO-66-3% membrane soaked in an electrolyte solution for 2 d in FIG. 8A and surface, cross-section, and locally-enlarged SEM images of an S/CUiO-66-3% membrane soaked in an electrolyte solution for 14 d in FIG. 8B to FIG. 8D, respectively.
Figure 8B:
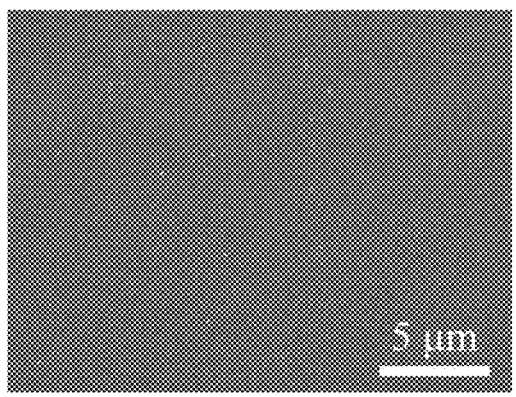
Figure 8C:
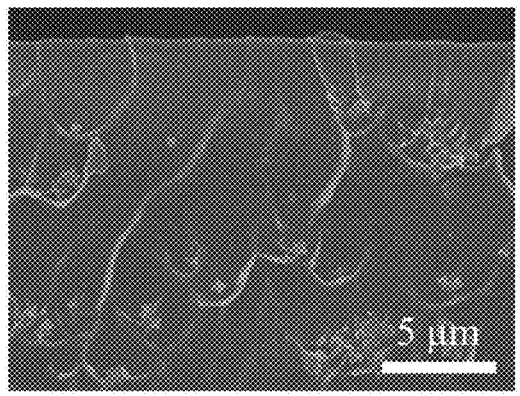
Figure 8D:
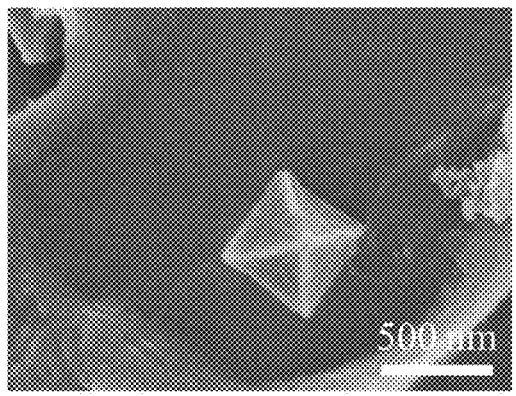

Two hybrid membranes including 3 wt % of UiO-66 and CUiO-66 particles respectively each were soaked in a vanadium-containing electrolyte solution (1.5 M $VO_2^+/3$ M $H_2SO_4$) for different time periods. The chemical stability of each membrane was investigated by observing a morphology change of each membrane. It can be seen from FIG. 8A that, after an S/UiO-66-3% membrane was soaked for 48 h, a large number of small pores caused by the falling-off of MOF particles were observed in a cross section of the membrane. In contrast, an S/CUiO-66-3% membrane exhibited excellent structural stability. After the S/CUiO-66-3% membrane was soaked for 14 d, there was no defect or damage on a surface of the membrane, and uniformly-distributed CMOF particles and a prominent filler/polymer interface could still be observed on a cross section of the membrane (FIG. 8B to FIG. 8D), indicating that the addition of CUiO-66 could improve the acid and oxidation resistance of a matrix membrane.

Physical and Chemical Properties of SPEEK/CUiO-66 Hybrid Membranes

Water Uptake and Swelling Performance

Figure 9:
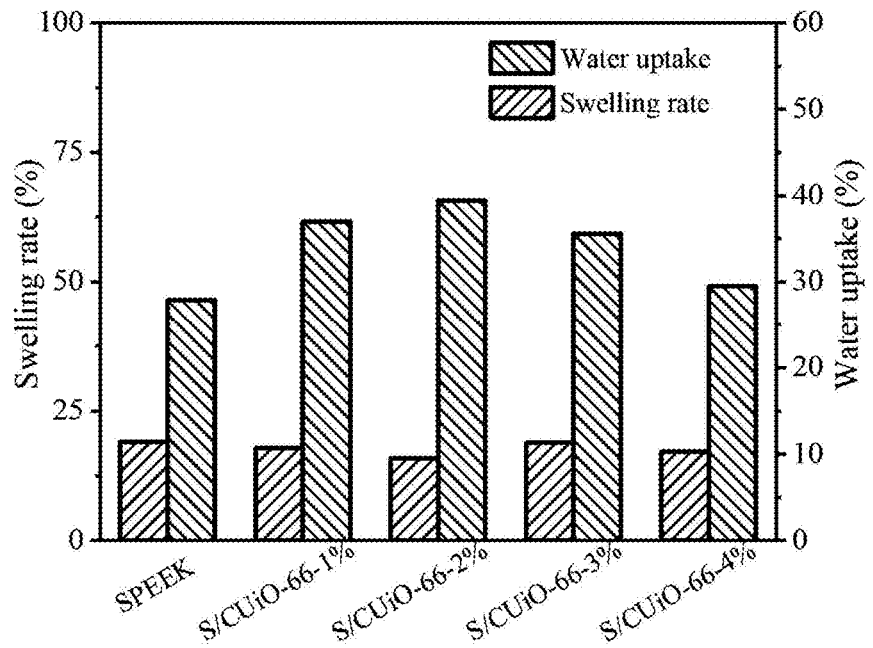
FIG. 9 shows the water uptake and swelling performance of an SPEEK membrane and S/CUiO-66-x % membranes (x=1 wt %, 2 wt %, 3 wt %, and 4 wt %)

FIG. 9 shows changes of water uptake and swelling rates of a hybrid membrane with a CUiO-66 content in the hybrid membrane. It can be seen from this figure that CUiO-66 can improve a water uptake rate of a membrane, a water uptake rate of a hybrid membrane first increases and then decreases with the increase of a CUiO-66 content, and an S/CUiO-66-2% hybrid membrane has a maximum water uptake rate (39.4%) which is about 11.5% higher than a water uptake rate of an SPEEK membrane. The SPEEK/CUiO-66 hybrid membranes have a lower swelling rate than the SPEEK membrane, which is attributed to the fact that a rigid skeleton structure of each hybrid membrane can inhibit the swelling of SPEEK polymer chains to some extent.

Mechanical Performance

Figure 10:
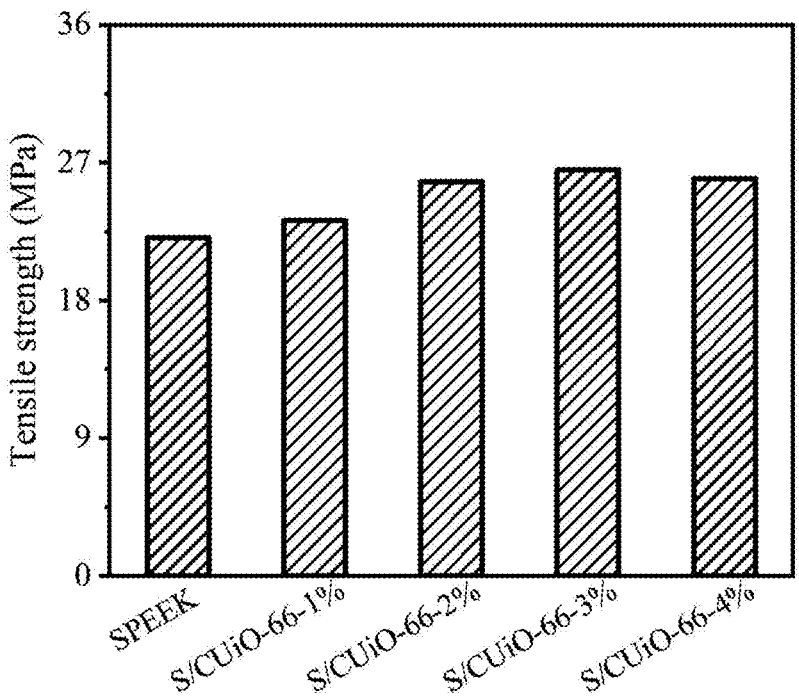
FIG. 10 shows the mechanical performance of an SPEEK membrane and S/CUiO-66-x % membranes (x=1 wt %, 2 wt %, 3 wt %, and 4 wt %)

FIG. 10 shows the mechanical performance of an SPEEK membrane and SPEEK/CUiO-66 hybrid membranes. A hybrid membrane with any doping amount has a higher tensile strength than the SPEEK membrane. This is because hydrogen bonding is formed between —$SO_3H$ groups in SPEEK and —OH groups in inorganic particles, which increases the mechanical stability and tensile strength of the membrane. An S/CUiO-66-3% membrane has a maximum tensile strength of 26.6 Mpa. When a CUiO-66 doping amount is 4 wt %, a tensile strength of a corresponding hybrid membrane decreases, but is still higher than a tensile strength of the SPEEK membrane, indicating that the introduction of CUiO-66 particles can effectively improve the mechanical performance of a membrane and prevent a hybrid membrane from being damaged during battery testing.

Proton Conductivity

Figure 11:
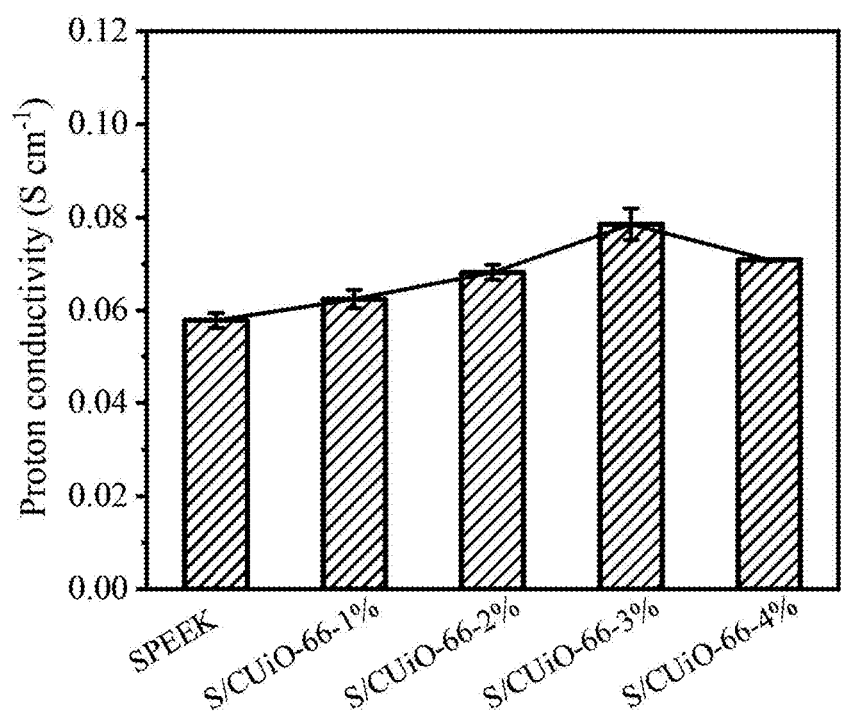
FIG. 11 shows proton conductivities of an SPEEK membrane and S/CUiO-66-x % membranes (x=1 wt %, 2 wt %, 3 wt %, and 4 wt %)

Ideal PEMs should have a high proton conductivity. With the increase of a CUiO-66 content, a proton conductivity of a hybrid membrane first increases and then decreases (FIG. 11). When a CUiO-66 addition amount is 3 wt %, a proton conductivity reaches a maximum of 0.079 S $cm^{-1}$. On the one hand, pores of CUiO-66 provide additional channels for proton transport, thereby improving a proton conductivity of the membrane. On the other hand, hydroxyl groups in CUiO-66 can be combined with protons through a vehicular mechanism to produce hydrated protons, thereby improving a proton conduction capacity of the membrane. This further proves that the addition of a carbonized material can improve a proton conductivity of an SPEEK matrix membrane.

Vanadium Ion Permeability and Ion Selectivity

Figure 12A:
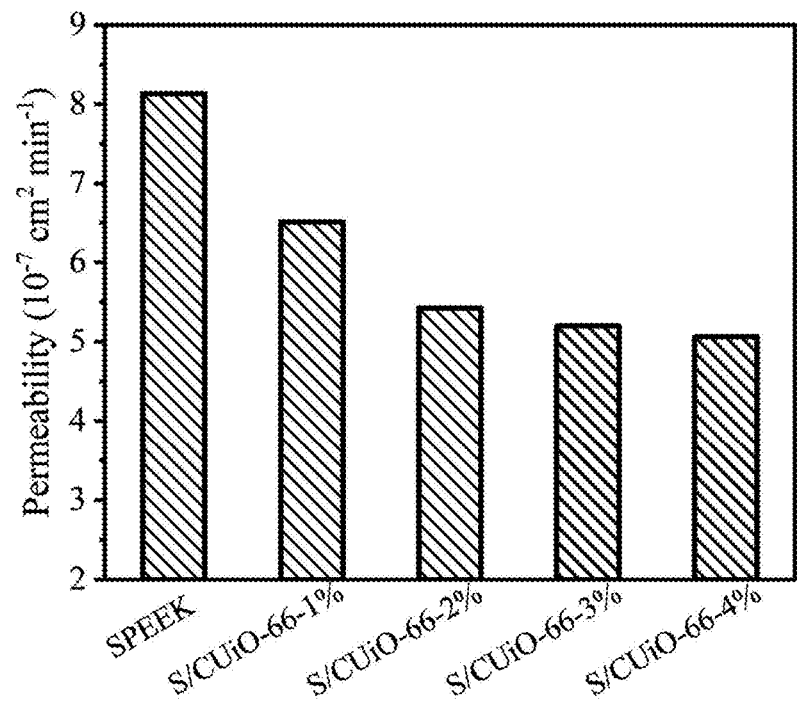
FIG. 12A and FIG. 12B show vanadium ion permeabilities FIG. 12A and ion selectivities FIG. 12B of an SPEEK membrane and S/CUiO-66-x % membranes (x=1 wt %, 2 wt %, 3 wt %, and 4 wt %)
Figure 12B:
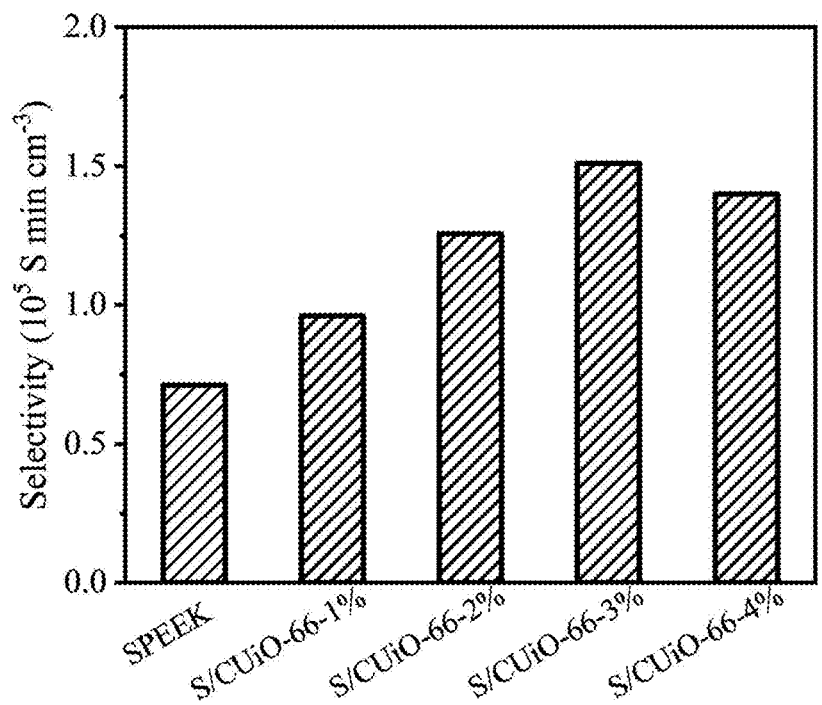

The vanadium ion permeabilities and ion selectivities of an SPEEK membrane and S/CUiO-66-x % (x=1 wt %, 2 wt %, 3 wt %, and 4 wt %) hybrid membranes are shown in FIG. 12A and FIG. 12B. It can be seen from FIG. 12A that the hybrid membranes have excellent vanadium resistance. Vanadium ion permeabilities of all hybrid membranes are lower than a vanadium ion permeability ($8.14 \times 10^{-7}$ $cm^2$ $min-1$) of the SPEEK membrane, and gradually decrease with the increase of a doping amount. A vanadium ion permeability of an S/CUiO-66-4% membrane is $5.06 \times 10^{-7}$ $cm^2$ $min^{-1}$. It should be noted that a vanadium ion permeability of an SPEEK/CUiO-66 membrane is slightly higher than a vanadium ion permeability of an SPEEK/CZIF-8 membrane, which is due to different thicknesses of the membranes prepared.

Ideal PEMs should have a low vanadium ion permeability and a high ion selectivity. The ion selectivity is adopted as an index to measure the comprehensive performance of a membrane. It can be seen from FIG. 12B that ion selectivities of the hybrid membranes are higher than an ion selectivity ($0.71 \times 10^5$ S min cm–3) of the SPEEK membrane, and due to a high proton conductivity, an S/CUiO-66-3% membrane has the optimal ion selectivity ($1.51 \times 10^5$ S min cm–3), indicating that the hybrid membranes have a higher VE value than the SPEEK membrane in cell performance.

Performance and Stability of VFBs

Figure 13:
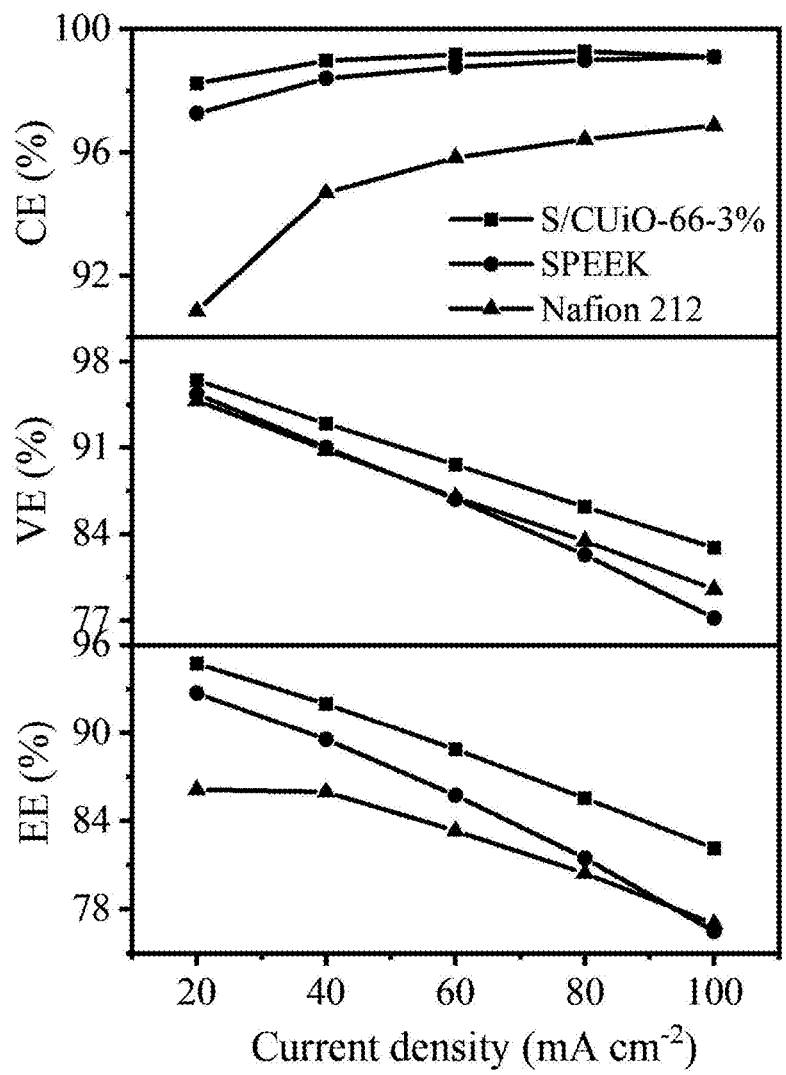
FIG. 13 shows the performance of VFBs of a Nafion 212 membrane, an SPEEK membrane, and an S/CUiO-66-3% membrane at a current density of 20 mA $cm^{-2}$ to 100 mA $cm^{-2}$.

In battery performance analysis, coulombic efficiency (CE), VE, and EE are three important factors to determine an efficiency of a battery. An S/CUiO-66-3% hybrid membrane was assembled in VFB, and the performance of the VFB at a current density of 20 mA $cm^{-2}$ to 100 mA $cm^{-2}$ was evaluated and compared with the performance of VFBs of Nafion 212 and SPEEK membranes. Results are shown in FIG. 13. With the increase of a current density, CE of the S/CUiO-66-3% membrane increases linearly, which is attributed to the fact that, with the increase of a current density, a time required for a charge-discharge test and a vanadium ion permeability are reduced. CE of the S/CUiO-66-3% membrane is higher than CEs of the Nafion 212 and SPEEK membranes, indicating that the S/CUiO-66-3% membrane has prominent vanadium resistance. In contrary, VE of the S/CUiO-66-3% membrane decreases with the increase of a current density, which is due to a voltage drop and concentration polarization generated during a test. With the increase of a current density, EE of the S/CUiO-66-3% membrane changes in the same trend as VE. EE of the SPEEK/CUiO-66-3% membrane is consistently higher than EEs of the Nafion 212 and SPEEK membranes. In addition, although the battery performance of the S/CUiO-66-3% membrane is slightly lower than the battery performance of the S/CZIF-8-3% membrane, the S/CUiO-66-3% membrane still exhibits a higher efficiency than the SPEEK membrane (CE: 99.1%, VE: 82.9%, and EE: 82.1%) at a current density of 100 mA $cm^{-2}$, indicating that the addition of CUiO-66 can improve a proton conductivity of the membrane and reduce a vanadium ion permeability of the membrane, thereby improving the battery performance.

Figure 14:
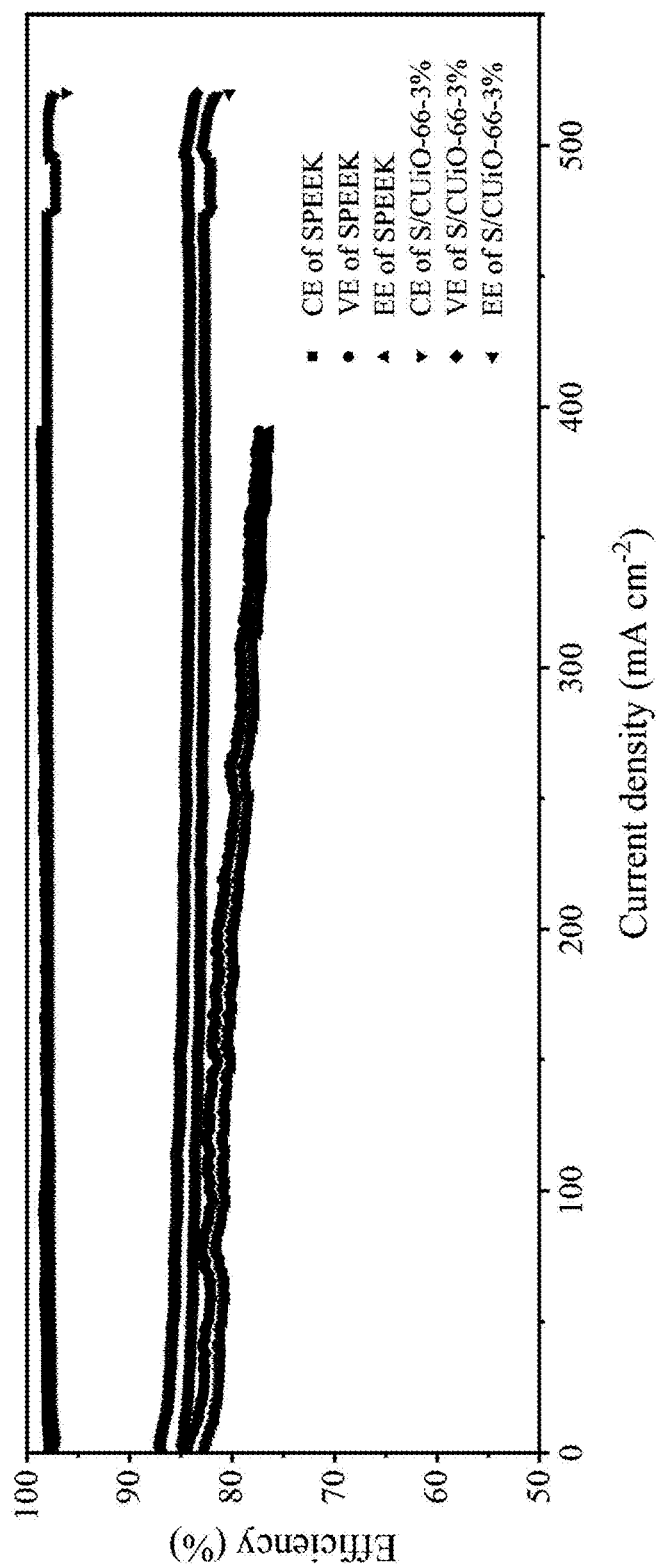
FIG. 14 shows long-cycle battery efficiencies of an S/CUiO-66-3% membrane at a current density of 100 mA $cm^{-2}$.

The battery efficiency and cycling stability of PEM in long-term charge-discharge cycles are also important factors to determine the performance of the PEM. As shown in FIG. 14, the SPEEK membrane and the S/CUiO-66-3% membrane each were subjected to a long-cycle stability test at a current density of 100 mA $cm^{-2}$. It can be seen that, compared with the SPEEK membrane, both CE and VE of the S/CUiO-66-3% membrane remain stable during a cycling process and still retain 98.1% and 84.5% respectively after about 500 charge-discharge cycles, and EE of the hybrid membrane is always higher than EE of the SPEEK membrane.

FIG. 15A shows capacity retention rates of the SPEEK membrane and the S/CUiO-66-3% membrane after 300 cycles at a current density of 100 mA $cm^{-2}$. After 300 charge-discharge cycles, the S/CUiO-66-3% membrane has a high capacity retention rate of 82.3%, and the capacity retention rate is much higher than a capacity retention rate of the SPEEK membrane, indicating that the hybrid membrane has a higher capacity retention capacity than the SPEEK membrane. In addition, a cross-section morphology of the hybrid membrane after charge-discharge cycles was observed by SEM. It can be seen that there are no ruptures or other defects in the hybrid membrane (FIG. 15B), indicating that the introduction of CUiO-66 nanoparticles can improve the structural and chemical stability of the hybrid membrane and the hybrid membrane can operate stably in VFB.

In Example 1, acid-stable CUiO-66 was prepared and mixed with SPEEK to prepare an SPEEK/CUiO-66 hybrid membrane. The crystals before and after carbonization and the hybrid membrane each were subjected to characterization and performance analysis. The following main conclusions are obtained:

(1) Characterizations such as SEM all indicate that UiO-66 and CUiO-66 are successfully synthesized, and a CUiO-66 powder has prominent acid resistance in a sulfuric acid solution and a vanadium-containing electrolyte solution and can be used in a VFB system.

(2) The hybrid membranes with different loads all are dense. It can be observed that CUiO-66 particles are uniformly dispersed in a matrix and there is a prominent filler/polymer interface. In addition, the hybrid membranes have excellent chemical stability in an acidic vanadium-containing electrolyte solution.

(3) The SPEEK/CUiO-66 hybrid membranes have enhanced water uptake and swelling performance, mechanical strengths, and proton conductivities. In particular, a proton conductivity of the S/CUiO-66-3% membrane is 0.079 S cm$^{-1}$. This is because the porous structure of CUiO-66 and the rapid transport of protons through a vehicular mechanism improve the proton conductivity.

(4) In a VFB test at different current densities, the S/CUiO-66-3% membrane exhibits higher CE, VE, and EE than the Nafion 212 and SPEEK membranes. EE of the S/CUiO-66-3% membrane can reach 82.1% at a current density of 100 mA cm$^{-2}$. The S/CUiO-66-3% membrane can stably undergo 500 cycles in a long-cycle test, with a capacity retention rate of 82.3%. After the cycles, the S/CUiO-66-3% membrane retains a prominent membrane morphology and has no obvious defects.

Example 2

Figure 16:
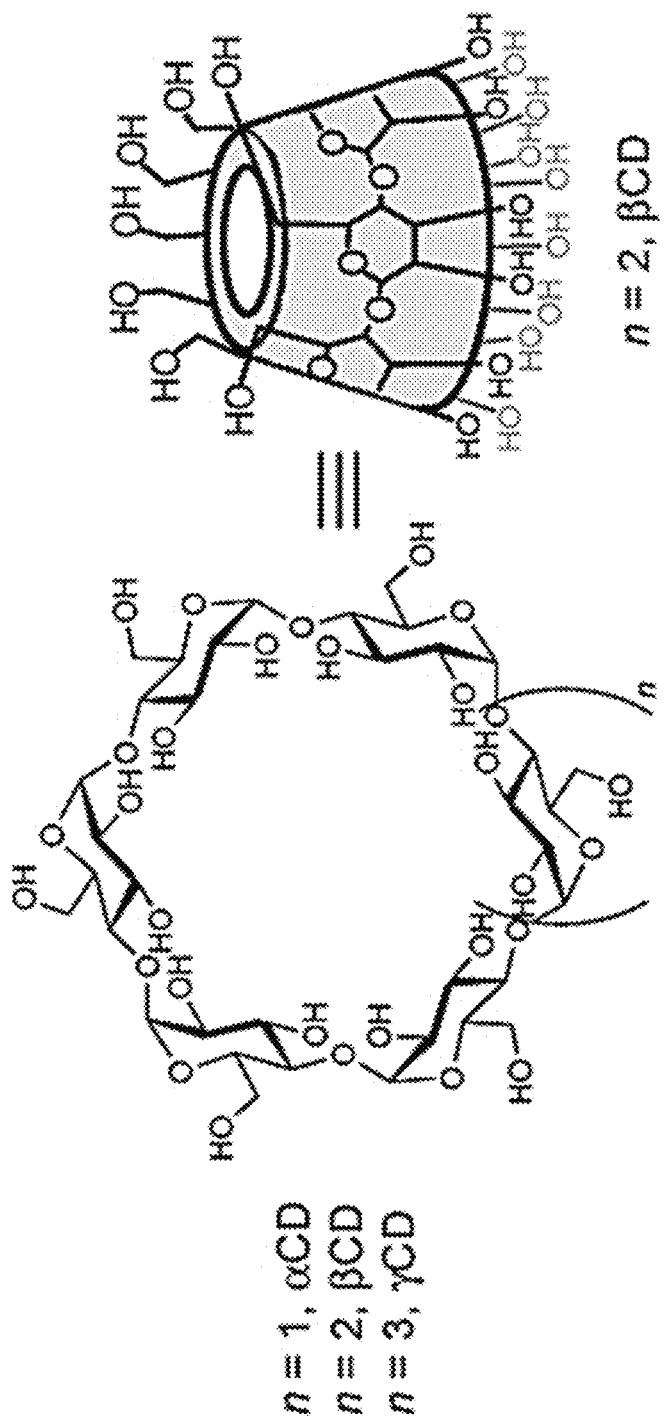
FIG. 16 shows a general structure of cyclodextrin.

The results of Example 1 show that the introduction of CUiO-66 can improve various physical and chemical properties of the original SPEEK membrane, but a water uptake rate and a tensile strength of a hybrid membrane are improved little, which may be due to poor binding between CUiO-66 and SPEEK and weak hydrophilicity. In order to further improve the performance, a surface of CUiO-66 was modified with externally-hydrophilic, low-cost, and eco-friendly β-CD as a regulator. It can be seen from FIG. 16 that a cyclodextrin molecule is rich in hydroxyl groups externally, which is conducive to enhancing the binding between β-CUiO-66 and SPEEK. Based on this, in Example 2, an impact of β-CD on a structure of CUiO-66 was investigated, and the physical and chemical properties and the battery performance of hybrid membranes before and after modification were compared.

Preparation of β-CUiO-66

UiO-66 was prepared through hydrothermal synthesis. The hydrothermal synthesis includes the following steps. 81.7 mL of DMF was added to a 250 mL beaker, and 190.3 mg of ZrCl$_4$, 133 mg of terephthalic acid, and 9.6 g of acetic acid were weighed and added to the DMF to obtain a mixture. The mixture was continuously stirred for 4 h at room temperature, ultrasonically treated for 20 min, then transferred to a 100 mL reactor, and subjected to a hydrothermal treatment at 120° C. for 24 h to obtain a reaction solution. The reaction solution was naturally cooled to room temperature and then centrifuged (10,000 r/min, 5 min) to collect a UiO-66 nanocrystal. The UiO-66 nanocrystal was washed with excess DMF and methanol several times, to collect a white product. Finally, the white product was dried overnight in a 60° C. oven to obtain a sample denoted as UiO-66.

A specified mass of a UiO-66 powder was weighed and added to a crucible, then placed in a palm tube furnace, and directly carbonized under an argon atmosphere. A carbonization process was as follows: The UiO-66 powder was heated at a heating rate of 5° C. min$^{-1}$ from 20° C. to 200° C. and kept at 200° C. for 1 h, then heated at the same heating rate to 400° C. and kept at 400° C. for 1 h, heated at a heating rate of 3° C. min$^{-1}$ to a target temperature of 600° C., annealed at the target temperature for 5 h, and finally naturally cooled to obtain a product denoted as CUiO-66.

A specified amount of CUiO-66 was weighed and dissolved in 10 mL of DMF to obtain a CUiO-66 solution. Then an equal amount of β-CD was weighed and added to the CUiO-66 solution to obtain a mixed solution. The mixed solution was stirred at room temperature for 30 min and filtered to collect a black product. The black product was finally dried overnight in an 80° C. oven to obtain a product denoted as β-CUiO-66.

Preparation of SPEEK/β-CUiO-66 Hybrid Membranes

The SPEEK/β-CUiO-66 hybrid membranes were prepared from a solution through casting. A preparation method of the hybrid membranes was as follows: A specified amount of β-CUiO-66 was dispersed in 10 mL of DMF to obtain a β-CUiO-66/DMF mixed solution, then 1.5 g of SPEEK was added to the β-CUiO-66/DMF mixed solution, an ultrasonic treatment was conducted for 30 min, and ball-milling was conducted for 24 h to obtain a homogeneous casting solution. The casting solution was allowed to stand for a few minutes before being scrape-coated. The casting solution was scrape-coated on a scraper machine, and then a corresponding glass plate was placed in a 60° C. blast drying oven for 6 h to allow preforming, then dried in a 100° C. vacuum-drying oven for 12 h, naturally cooled, and soaked in deionized water to peel off a hybrid membrane. The prepared hybrid membranes each were soaked in a 1 M H$_2$SO$_4$ solution for 24 h to allow activation, and then stored in fresh deionized water for later use. The prepared hybrid membranes each were denoted as S/β-CUiO-66-x % (x=1 wt %, 2 wt %, 3 wt %, and 4 wt %).

Characterization of Materials

Morphology Analysis

Figure 17:
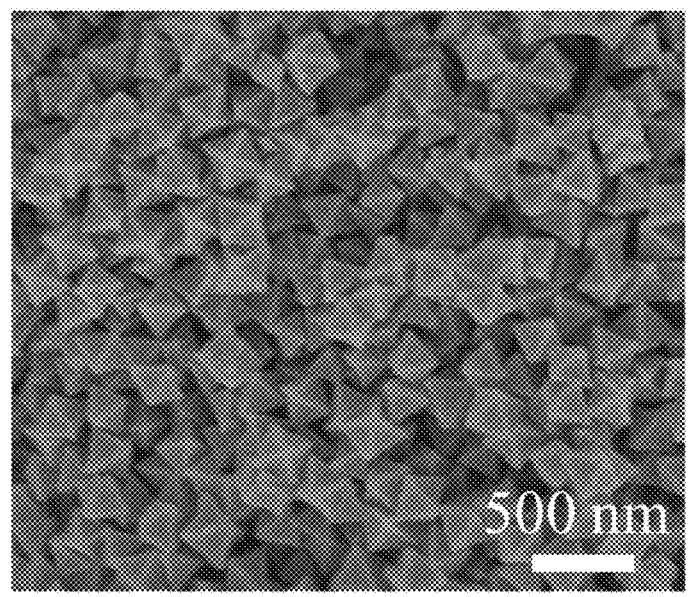
FIG. 17 shows an SEM image of β-CUiO-66.

A morphology of the β-CUiO-66 sample was analyzed by SEM, as shown in FIG. 17. After the surface modification with cyclodextrin, the sample still had a regular octahedral structure, a more uniform particle size, and an average particle size reduced to about 300 nm, indicating that the modification of β-CD had no significant impact on the morphology of CUiO-66.

BET Characterization

Figures 18A, 18B:
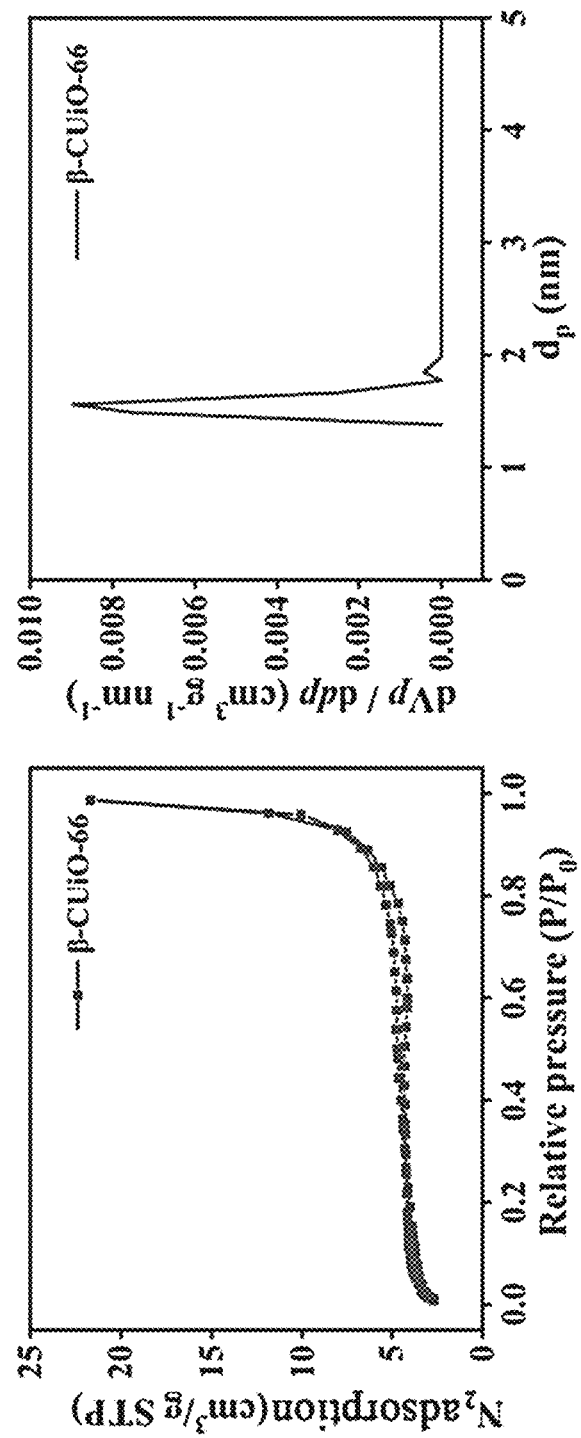
FIG. 18A and FIG. 18B show a $N_2$ adsorption-desorption curve FIG. 18A and a pore size distribution FIG. 18B of β-CUiO-66.

A N$_2$ adsorption-desorption curve and a pore size distribution of β-CUiO-66 are shown in FIG. 18A and FIG. 18B. According to N$_2$ adsorption-desorption results, CUiO-66 has a typical mesoporous structure characteristic. β-CUiO-66 retains the original porous structure without obvious mesopores, and has a N$_2$ adsorption capacity significantly reduced and a specific surface area significantly reduced to 15.8 m$^2$ g$^{-1}$. Pore sizes of β-CUiO-66 are concentrated and mainly distributed at 1.6 nm.

Stability Analysis

Figure 19:
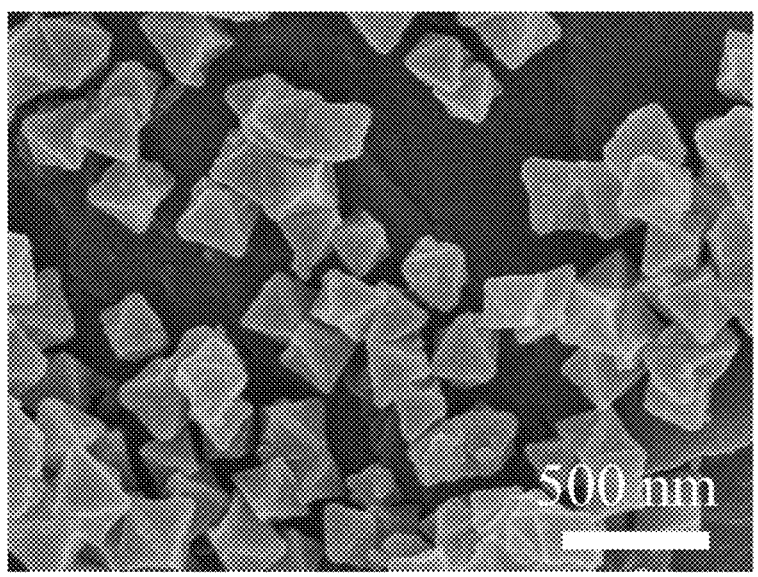
FIG. 19 shows an SEM image of β-CUiO-66 soaked in a 3 M $H_2SO_4$ solution for 2 d.

Similarly, β-CUiO-66 was soaked in a 3 M sulfuric acid solution for 48 h, and a morphology change was observed by SEM. Results are shown in FIG. 19. It can be clearly seen that a morphology of β-CUiO-66 soaked in an acid is not much different from a morphology of the original sample, indicating that β-CUiO-66 still has excellent acid resistance.

Characterization of SPEEK/β-CUiO-66 Hybrid Membranes

Morphology Analysis

Figure 20A:
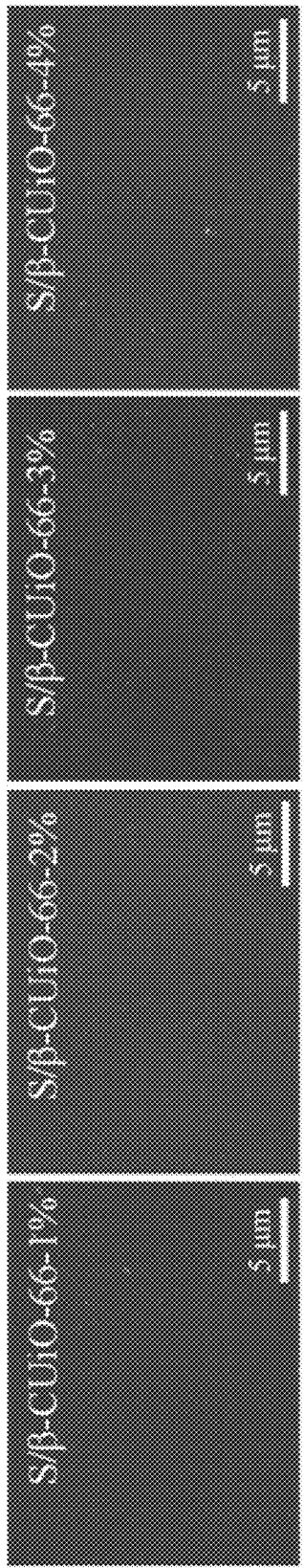
FIG. 20A and FIG. 20B show surface FIG. 20A and cross-section FIG. 20B SEM images of hybrid membranes (x=1 wt %, 2 wt %, 3 wt %, and 4 wt %)
Figure 20B:
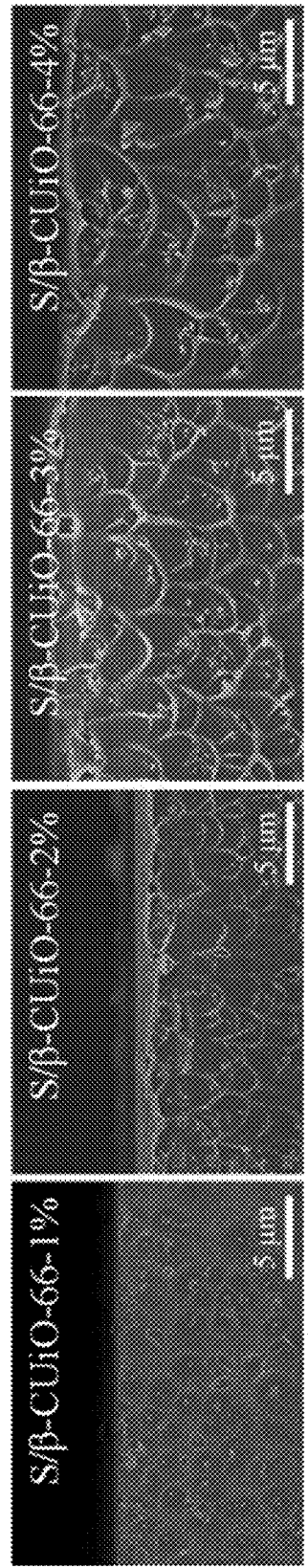
Figure 21:
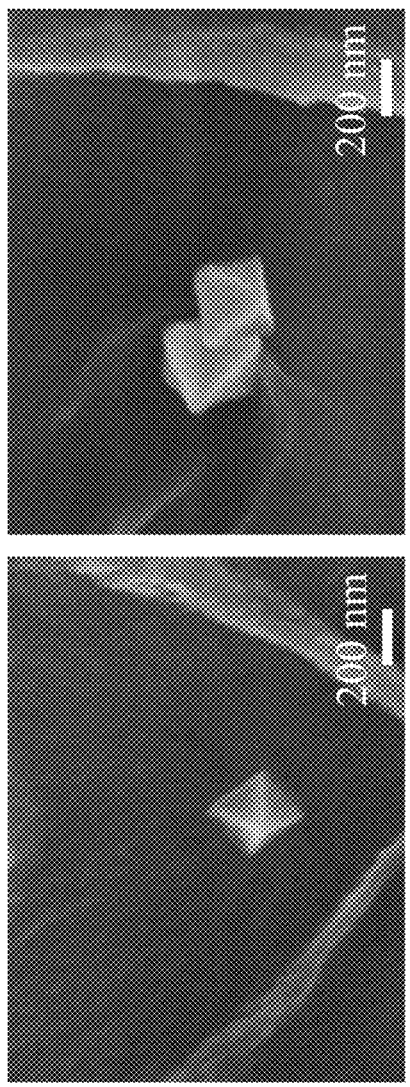
FIG. 21 shows SEM images of a filler/polymer interface in an S/β-CUiO-66-3% membrane.

Surfaces and cross sections of the hybrid membranes were observed by SEM. It can be seen from FIG. 20A that surfaces of the hybrid membranes with β-CUiO-66 addition amounts of 1 wt % to 4 wt % all are dense and do not have any obvious wrinkles and phase separation. It can be seen from the cross-section images in FIG. 20B that, when a filler content is low, the filler is evenly dispersed in a hybrid membrane, and when the filler content exceeds 3 wt %, there is obvious particle agglomeration phenomenon and the dispersion of β-CUiO-66 is poor, which are the same as the conditions of the S/CUiO-66 hybrid membranes. There are some collapses at a top of a cross section, which is caused by a quenching process in liquid nitrogen. A prominent matrix/filler binding interface can be observed when a cross section of the S/β-CUiO-66-3% membrane is magnified (FIG. 21).

Chemical Stability Analysis

Figure 22C:
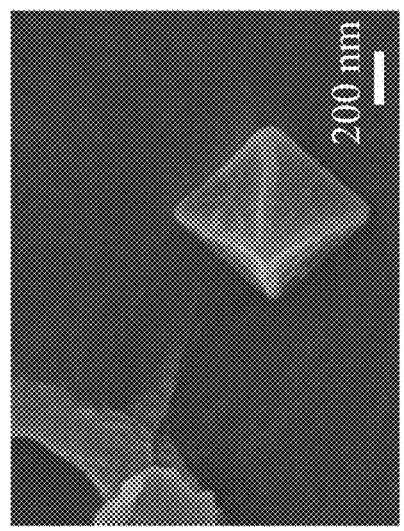
FIG. 22A to FIG. 22C show surface FIG. 22A, cross-section FIG. 22B, and locally-enlarged FIG. 22C SEM images of an S/β-CUiO-66-3% membrane soaked in an electrolyte solution for 14 d.
Figure 22B:
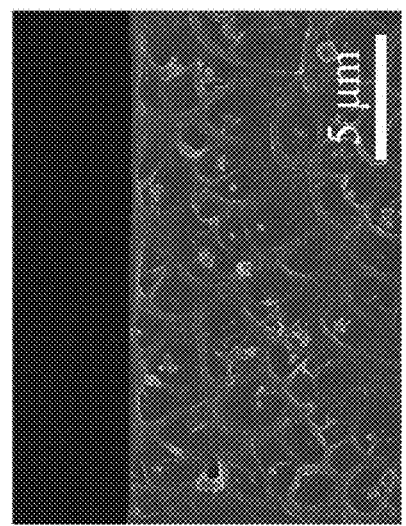
Figure 22A:
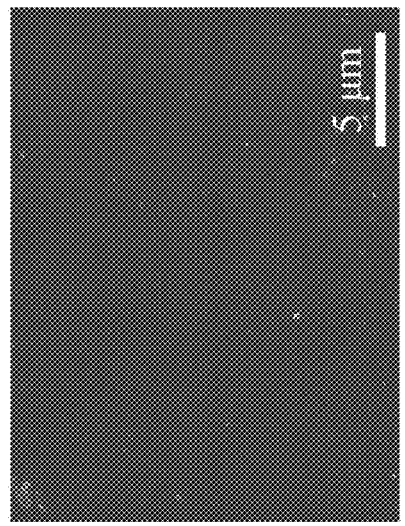

The S/β-CUiO-66-3% membrane was soaked in a vanadium ion-containing acidic electrolyte for a specified period of time to investigate the chemical stability of the membrane in strongly acidic and oxidative environments. Results are shown in FIG. 22A to FIG. 22C. Like the S/CUiO-66 membrane, after the S/β-CUiO-66-3% membrane is soaked in the electrolyte for 14 d, no significant defects are observed on a surface of the hybrid membrane, β-CUiO-66 particles are still evenly dispersed in the hybrid membrane, and there are no cracks between β-CUiO-66 and SPEEK. It indicates that the modification with β-CD does not change the acid and oxidation resistance of the original CUiO-66, and the hybrid membrane prepared accordingly has excellent chemical stability.

Water Uptake and Swelling Performance

Figure 23:
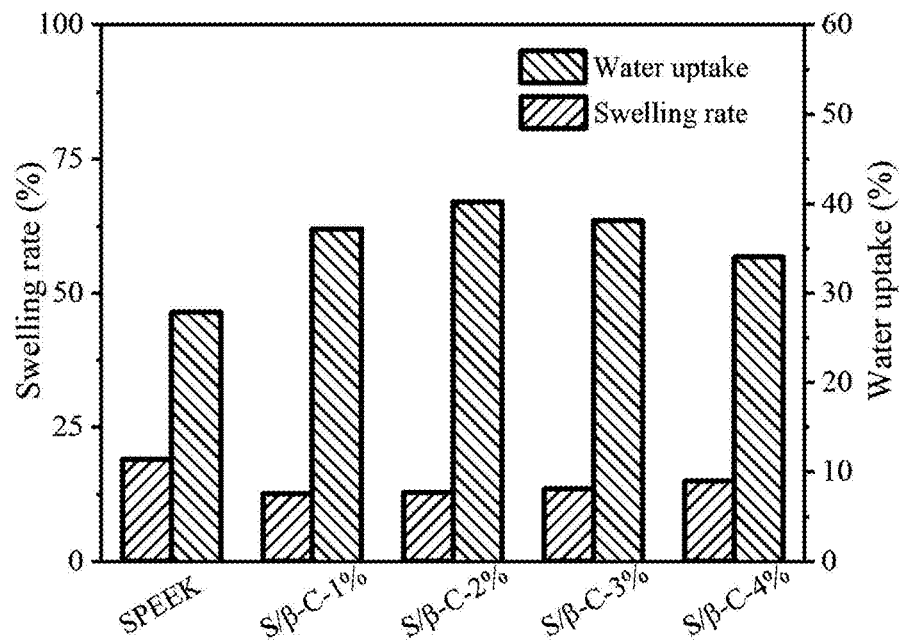
FIG. 23 shows the water uptake and swelling performance of an SPEEK membrane and S/β-CUiO-66-x % membranes (x=1 wt %, 2 wt %, 3 wt %, and 4 wt %)

FIG. 23 shows changes of water uptake and swelling rates of the S/β-CUiO-66 hybrid membranes with a β-CUiO-66 content (the hybrid membranes in this figure are simply denoted as S/β-C-x %, where x=1 wt %, 2 wt %, 3 wt %, and 4 wt %). It can be clearly seen from this figure that the hybrid membranes doped with β-CD-modified CUiO-66 have significantly-improved water uptake rates, and a water uptake rate of the S/β-C-3% membrane reaches 40.2%, which is 12.3% higher than a water uptake rate of the SPEEK membrane. Compared with the S/CUiO-66 membrane, a water uptake rate of the S/β-CUiO-66 hybrid membrane increases with the increase of a β-CUiO-66 doping amount. A water uptake rate of the S/β-C-4% membrane increases by about 4.6% compared with a water uptake rate of the S/CUiO-66-4% membrane, indicating that the hydrophilic β-CUiO-66 has a promoting effect on a water uptake rate of the membrane. In addition, swelling rates of the S/β-CUiO-66 hybrid membranes are further reduced.

Mechanical Performance

Figure 24:
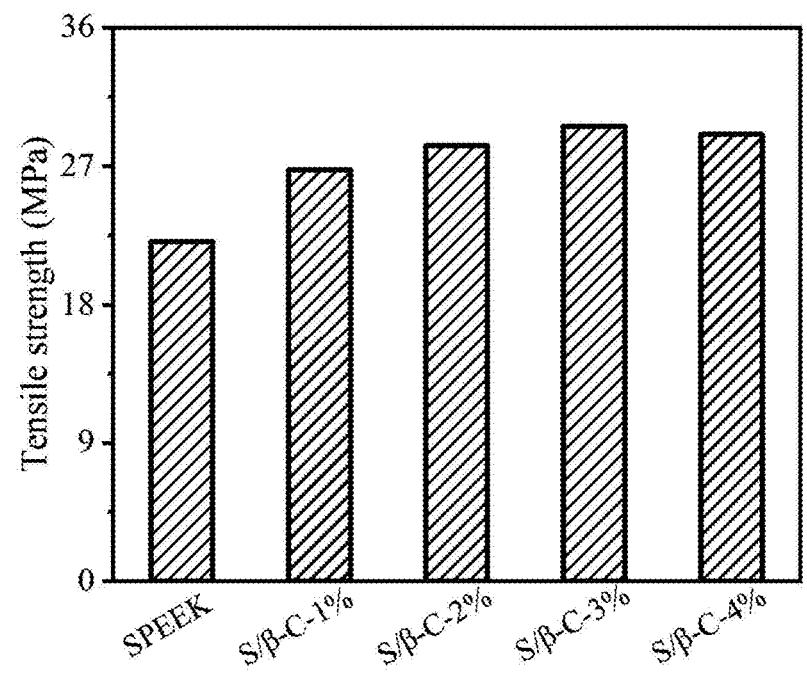
FIG. 24 shows the mechanical performance of an SPEEK membrane and S/β-CUiO-66-x % membranes (x=1 wt %, 2 wt %, 3 wt %, and 4 wt %)

FIG. 24 shows the mechanical performance of the SPEEK membrane and S/β-CUiO-66 hybrid membranes. It can be seen from this figure that a tensile strength of the S/β-CUiO-66 hybrid membrane increases significantly with the increase of a β-CUiO-66 content, and increases to 29.6 MPa when a mass fraction of β-CUiO-66 is 3 wt %. A tensile strength of the S/β-CUiO-66 hybrid membrane is also improved compared with the SPEEK/CUiO-66 hybrid membrane. The excellent mechanical performance of the S/β-CUiO-66 hybrid membrane can be attributed to the following two aspects: 1. An interaction between SPEEK and β-CUiO-66 can effectively improve the rigidity of a membrane and make the membrane not prone to deformation, which is consistent with the swelling rate results in FIG. 5A and FIG. 5B to FIG. 8A to FIG. 8D. 2. The prominent compatibility between an SPEEK polymer and a β-CUiO-66 filler in a membrane (FIG. 21) also enhances a tensile strength of the membrane. Therefore, the S/β-CUiO-66 hybrid membranes have better mechanical performance than the SPEEK membrane.

Performance of VFBs

Figure 25:
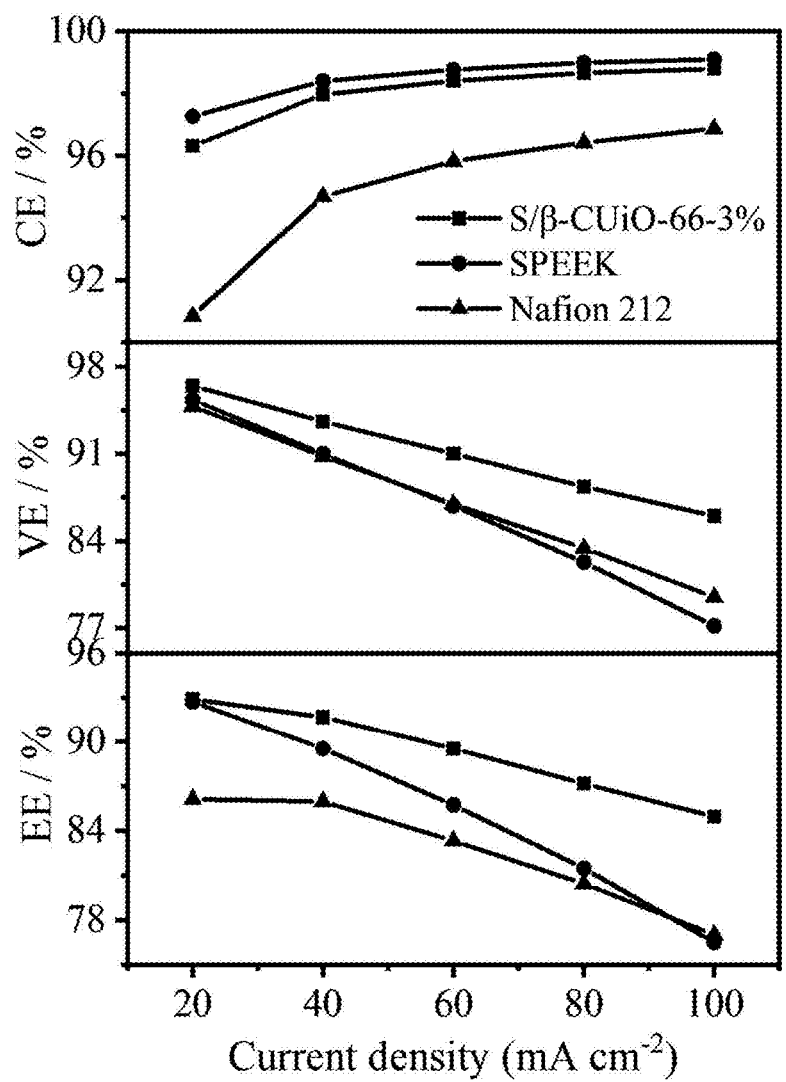
FIG. 25 shows the performance of VFBs of a Nafion 212 membrane, an SPEEK membrane, and an S/β-CUiO-66-3% membrane at a current density of 20 mA $cm^{-2}$ to 100 mA $cm^{-2}$.

FIG. 25 shows efficiency curves of VFBs assembled with the S/β-CUiO-66-3% hybrid membrane, the Nafion 212 membrane, and the SPEEK membrane at a current density of 20 mA cm$^{-2}$ to 100 mA cm$^{-2}$. Like the S/CUiO-66-3% hybrid membrane, CE of the S/β-CUiO-66-3% membrane increases with the increase of a current density, but CEs of the S/β-CUiO-66-3% membrane at all current densities are lower than CEs of the SPEEK membrane. Since CE of a membrane is mainly affected by a VO$_2^+$ permeability, it can be known that β-CUiO-66 may not have an ability to improve the vanadium resistance of an SPEEK matrix membrane. VE of the battery decreases with the increase of a current density, and reaches 86.0% even at a current density of 100 mA cm$^{-2}$. Compared with the SPEEK membrane, VE of the S/β-CUiO-66-3% membrane is significantly improved, indicating that the S/β-CUiO-66-3% membrane has a higher proton conduction capacity than the SPEEK membrane. The S/β-CUiO-66-3% membrane has a high EE. Because a voltage drop of a battery increases at a high current density, the EE decreases with the increase of a current density, and a decrease rate of the S/β-CUiO-66-3% membrane is lower than decrease rates of the Nafion 212 and SPEEK membranes. At a current density of 100 mA cm$^{-2}$, EE of the S/β-CUiO-66-3% hybrid membrane is about 8.0% and 8.5% higher than EEs of the Nafion 212 and SPEEK membranes, respectively.

Figure 26:
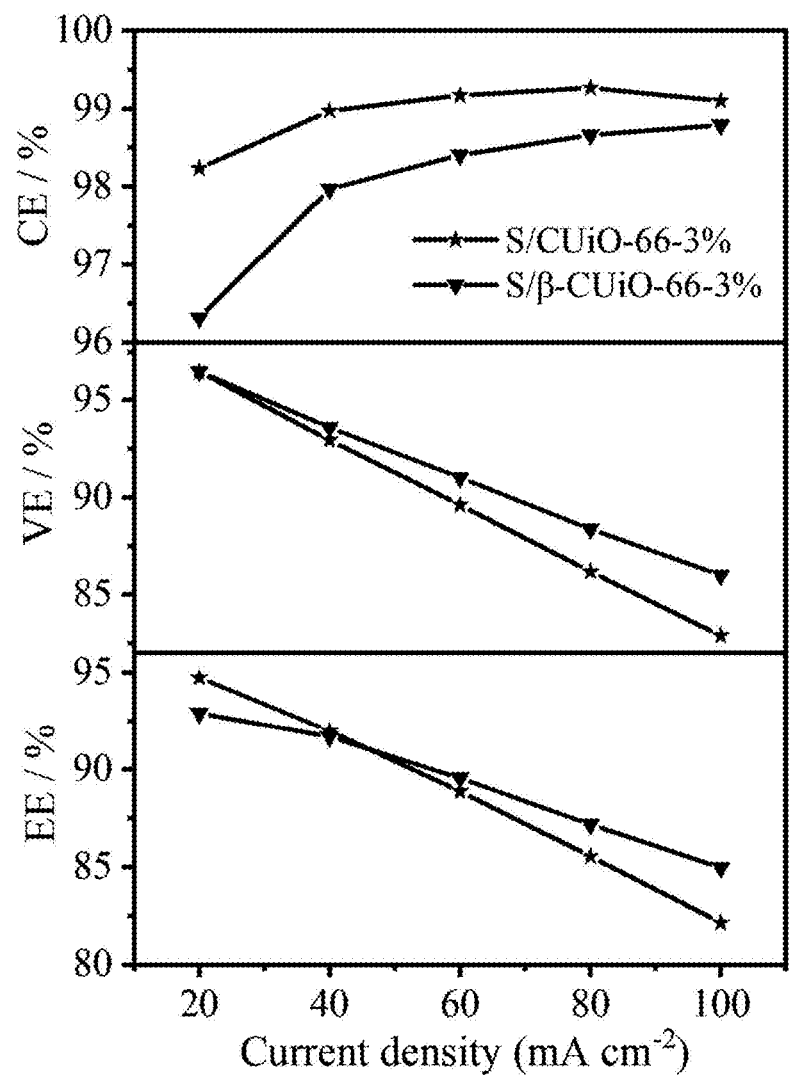
FIG. 26 shows the performance comparison of VFBs at a current density of 20 mA $cm^{-2}$ to 100 mA $cm^{-2}$.

In order to determine a difference between impacts of CUiO-66 and β-CUiO-66 on the performance of a membrane battery, CEs, VEs, and EEs of the S/CUiO-66-3% and S/β-CUiO-66-3% membranes at a same current density were compared, as shown in FIG. 26. On the one hand, the addition of β-CUiO-66 reduces a CE of the membrane, which is attributed to the following fact: A size of large-mouthed ends of pores in j-CD is slightly larger than a diameter of a hydrated vanadium ion, and thus vanadium ions enter pores of CUiO-66 through cavities of j-CD, which reduces the vanadium resistance of the membrane. On the other hand, VE of the β-CUiO-66-doped hybrid membrane is improved compared with the CUiO-66-doped hybrid membrane, which is particularly significant at a high current density. After a surface of CUiO-66 is modified with a β-CD molecule, a large number of —OH groups on the surface can form hydrogen bonds with water molecules, which further accelerates the proton transport in the membrane. As a result, the S/β-CUiO-66-3% membrane exhibits high battery performance, and has VE and EE of 86.0% and 85.0% respectively at a current density of 100 mA cm$^{-2}$, which are higher than the 82.9% and 82.1% of the S/CUiO-66-3% membrane, respectively.

In this example, β-CD-modified β-CUiO-66 was added to an SPEEK matrix to prepare an SPEEK/β-CUiO-66 hybrid membrane, and the hybrid membrane was subjected to characterization and performance tests. The following conclusions are obtained:

(1) SEM characterization results show that the SPEEK/β-CUiO-66 hybrid membrane has a dense and uniform cross section, and exhibits prominent chemical stability under strong acid and strong oxidation conditions.

(2) Due to an interaction between β-CUiO-66 and SPEEK, a water uptake rate and a tensile strength of the SPEEK/β-CUiO-66 hybrid membrane are greatly improved and a swelling rate of the SPEEK/β-CUiO-66 hybrid membrane decreases significantly compared with the SPEEK membrane. In addition, SPEEK/β-CUiO-66 hybrid membranes with different β-CUiO-66 contents all have better performance than an SPEEK/CUiO-66 hybrid membrane with a corresponding doping ratio. For example, for the S/CUiO-66-3% membrane: a water uptake rate increases by 2.6% and a tensile strength increases by 3.1 MPa.

(3) VFB assembled with the S/β-CUiO-66-3% hybrid membrane has higher VE and EE than VFBs assembled with the SPEEK membrane and the S/CUiO-66-3% hybrid membrane, and has VE and EE of 86.0% and 85.0% respectively at a current density of 100 mA cm$^{-2}$, which are 8.5% and 2.9% higher than VE and EE of the SPEEK membrane and the S/CUiO-66-3% membrane, respectively.

The above are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A hybrid membrane based on UiO66 modification, wherein the hybrid membrane comprises a polymer matrix doped with carbonized UiO-66; a surface of the carbonized UiO-66 is further modified with β-cyclodextrin (β-CD);

the polymer matrix is sulfonated poly(ether ether ketone) (SPEEK); and a preparation method of the hybrid membrane based on the UiO66 modification comprises the following steps:

S1, preparing and carbonizing UiO-66 to obtain the carbonized UiO-66; and

S2, mixing the carbonized UiO-66 with the polymer matrix to prepare a casting solution, and preparing the hybrid membrane with the casting solution through casting, wherein after the S1 and before the S2, the preparation method further comprises a step of modifying the surface of the carbonized UiO-66 with the β-CD;

the step of modifying the surface of the carbonized UiO-66 with the β-CD is as follows: dissolving the carbonized UiO-66 in N,N-dimethylformamide (DMF), adding the β-CD, stirring and filtering to obtain a filter residue, and oven-drying the filter residue;

a mass ratio of the β-CD to the carbonized UiO-66 is 1:(0.8 to 1.2); and an amount of the carbonized UiO-66 is 1% to 3% of an amount of the SPEEK.

2. The hybrid membrane based on the UiO66 modification according to claim 1, wherein in the S1, the UiO-66 is prepared through hydrothermal synthesis, and the hydrothermal synthesis comprises the following steps: dissolving ZrCl$_4$, terephthalic acid, and acetic acid in DMF, thoroughly mixing, and performing a hydrothermal treatment; and cooling, centrifuging, washing, and drying to obtain the UiO-66, wherein the ZrCl$_4$, the terephthalic acid, and the acetic acid are in a ratio of (180 to 200) mg (120 to 140) mg:(8 to 12) g.

3. The hybrid membrane based on the UiO66 modification according to claim 1, wherein in the S1, the carbonizing of the UiO-66 is conducted as follows: placing the UiO-66 in a tube furnace; in an argon atmosphere, performing gradient heating and heat preservation until a temperature reaches 550° C. to 650° C.; and annealing for 4 h to 6 h, followed by cooling.

4. The hybrid membrane based on the UiO66 modification according to claim 1, wherein in the S2, a preparation process of the casting solution is as follows: dispersing the carbonized UiO-66 and the SPEEK in DMF, and performing an ultrasonic treatment and ball-milling.

5. The hybrid membrane based on the UiO66 modification according to claim 1, wherein in the S2, the preparing of the hybrid membrane with the casting solution through the casting is conducted as follows: scrape-coating the casting solution on a scraper machine, preforming at 55° C. to 75° C. for 5 h to 7 h, drying at 90° C. to 110° C. under vacuum for 11 h to 14 h, cooling, and peeling the hybrid membrane off.

6. Use of the hybrid membrane based on the UiO66 modification according to claim 1 in a vanadium flow battery.

* * * * *